US010753677B2

(12) United States Patent
Suraganda Narayana et al.

(10) Patent No.: US 10,753,677 B2
(45) Date of Patent: Aug. 25, 2020

(54) METHODS AND SYSTEMS FOR ENHANCING PRODUCTION OF LIQUEFIED NATURAL GAS

(71) Applicant: General Electric Company, Schenectady, NY (US)

(72) Inventors: Arul Saravanapriyan Suraganda Narayana, Cumming, GA (US); Thomas Ross Youmans, Dubai (AE); Rahul Chadha, Marietta, GA (US); Lana El Chaar, Dubai (AE)

(73) Assignee: General Electric Company, Schenectady, NY (US)

( * ) Notice: Subject to any disclaimer, the term of this patent is extended or adjusted under 35 U.S.C. 154(b) by 385 days.

(21) Appl. No.: 15/617,314

(22) Filed: Jun. 8, 2017

(65) Prior Publication Data

US 2018/0356151 A1 Dec. 13, 2018

(51) Int. Cl.
*F25J 1/02* (2006.01)
*F25J 1/00* (2006.01)
*G05B 23/02* (2006.01)

(52) U.S. Cl.
CPC ........... *F25J 1/0252* (2013.01); *F25J 1/0022* (2013.01); *F25J 1/0242* (2013.01); *F25J 1/0248* (2013.01); *F25J 1/0284* (2013.01); *G05B 23/0283* (2013.01); *F25J 2220/62* (2013.01); *F25J 2220/64* (2013.01); *F25J 2220/66* (2013.01); *F25J 2240/70* (2013.01); *F25J 2240/82* (2013.01); *G05B 2219/45076* (2013.01)

(58) Field of Classification Search
CPC ........... F25J 1/0242; F25J 1/0243–0249; F25J 1/0252–0255; F25J 2280/00–50; F25J 1/0284
See application file for complete search history.

(56) References Cited

U.S. PATENT DOCUMENTS

| | | | |
|---|---|---|---|
| 4,809,154 A * | 2/1989 | Newton | F25J 1/023 700/28 |
| 9,181,077 B2 | 11/2015 | Lee et al. | |
| 2008/0059080 A1 * | 3/2008 | Greiner | H04L 41/0681 702/33 |
| 2011/0056237 A1 | 3/2011 | Teo | |
| 2017/0336091 A1 * | 11/2017 | Arensmeier | G05B 15/02 |

* cited by examiner

*Primary Examiner* — Keith M Raymond
*Assistant Examiner* — Webeshet Mengesha
(74) *Attorney, Agent, or Firm* — Hoffman Warnick LLC

(57) ABSTRACT

A method for enhancing a LNG production train that includes connected train components. The method may include steps of: constructing an integrated surveillance system for monitoring operation of the train components; using the integrated surveillance system to measure and record operational data and event data related to, respectively, the operation and a failure event of the train components over a historical operating period; performing a correlation analysis that calculates a correlation between the occurrences of the failure event and the operational data; given results of the correlation analysis, deriving a prognostic rule that indicates a likelihood of the failure event occurring based on values of the operating parameters of the operational data; applying the prognostic rule to current values of the operating parameters and determining therefrom the likelihood of the failure event occurring; determining an advisory related to the determined likelihood of the failure event occurring; and issuing the advisory.

21 Claims, 8 Drawing Sheets

METHODS AND SYSTEMS FOR ENHANCING PRODUCTION OF LIQUEFIED NATURAL GAS

BACKGROUND OF THE INVENTION

The invention of the present application generally relates to methods and system for producing liquefied natural gas and, more particularly, to methods and systems for enhancing performance of natural gas liquefaction plants used to produce liquefied natural gas.

As will be appreciated, many large, naturally occurring reserves of natural gas are located in remote areas of the world. As one of the cleanest burning fossil fuels, this gas has considerable value if it can be economically transported to market. Where the gas reserves are found in reasonable proximity to a market, the gas is typically produced and then transported to market through submerged land-based pipelines. However, when gas is produced in locations where laying a pipeline is infeasible or economically prohibitive, other techniques must be used for getting this gas to market.

A commonly used technique for non-pipeline transport of gas involves liquefying the gas at or near the production site and then transporting the liquefied natural gas (also "LNG") to market in specially-designed storage tanks aboard transport vessels. The cryogenic liquefaction of natural gas is routinely practiced as a means of converting natural gas into a more convenient form for transportation and storage. Such liquefaction reduces the volume of the natural gas by about 600-fold and results in a product which can be stored and transported at near atmospheric pressure. To do this, the natural gas is cooled and condensed to a liquid state to produce LNG. Such LNG is typically transported at substantially atmospheric pressure and at temperatures of about −151° C. (−240° F.) to −162° C. (−260° F.), thereby significantly increasing the amount of gas which can be stored in a particular storage tank on a transport vessel. Once an LNG transport vessel reaches its destination, the LNG is typically off-loaded into other storage tanks from which the LNG can then be revaporized as needed and transported as a gas to end users through pipelines or the like. LNG has become an increasingly popular method of transporting natural gas to major energy-consuming customers.

Processing plants used to liquefy natural gas, which may be referred to herein as "liquefaction plants", are typically built in stages as the supply of feed gas, i.e. natural gas, and the quantity of gas contracted for sale, increases. One traditional method of configuring a liquefaction plant is to build up the site in several sequential increments, or parallel "LNG production trains". Each stage of construction may consist of a separate, stand-alone production train, which, in turn, is comprised of all the individual processing units or steps necessary to liquefy a stream of feed gas into LNG and send it on to storage. Each production train may function as an independent production facility. Production train size can depend heavily upon the extent of the resource, technology and equipment used within the train, the available funds for investment in the project development, and market conditions.

Operability and profitability of LNG plants during its life depends on gaining effective operational intelligence and then converting that into business intelligence. Establishing the process per design recommendations and/or controlling the process beyond design exposure due to varying operational dynamics presents a significant challenge for process engineers and, as will be appreciated, maintaining the plant at near optimal conditions is difficult. Thermodynamics and hydraulics constitute an important role in determining the gas-liquid ratio for optimized LNG production. Any imbalances can lead to significant energy and material losses. The associated cost of high specific energy consumed by refrigeration systems and/or the generation of excess flash gas in cryogenic processes can be considerable. In trying to optimize or enhance production efficiency and limit these costs, conventional systems have failed to connect upstream process dynamics to downstream effects. As an example, the pressure drop associated with a partially fouled heat exchanger is often not linked to the increased power consumption of the downstream booster compressor. Further, in conventional systems, critical equipment is given much attention in terms of maintaining reliability and availability at an assets level, while performance losses and the impact those losses have on the overall process have generally been overlooked.

Due to the increase in LNG demand seen in recent years, greater emphasis is now being placed on efficiency and performance of liquefaction plants in order to reduce the cost of the delivered gas. Methods and systems that offer such optimized or enhanced operation would be commercially valuable, particularly as they address the several shortcomings found in conventional systems in use today.

BRIEF DESCRIPTION OF THE INVENTION

The present application thus describes a method for enhancing a performance of a liquefied natural gas (LNG) production train, the LNG production train having connected train components. According to exemplary embodiments, the method includes the steps of: constructing an integrated surveillance system for monitoring an operation of the train components, wherein the integrated surveillance system includes multiple sensors positioned within each of the train components for measuring and recording: operational data, which includes data relating to operating parameters; and event data, which includes data relating to an occurrence of a failure event; using the integrated surveillance system to measure and record the operational data and the event data related to the operation of the train components over a historical operating period; performing a correlation analysis that calculates a correlation between the occurrences of the failure event and the operational data that precedes the failure event within the historical operating period; given results of the correlation analysis, deriving a prognostic rule that indicates a likelihood of the failure event occurring based on values of the operating parameters of the operational data; applying the prognostic rule to current values of the operating parameters and determining therefrom the likelihood of the failure event occurring; determining an advisory related to the determined likelihood of the failure event occurring; and issuing the advisory. These and other features of the present application will become more apparent upon review of the following detailed description of the preferred embodiments when taken in conjunction with the drawings and the appended claims.

These and other features of the present application will become apparent upon review of the following detailed description of the preferred embodiments when taken in conjunction with the drawings and the appended claims.

DETAILED DESCRIPTION OF THE INVENTION

Figure 1:
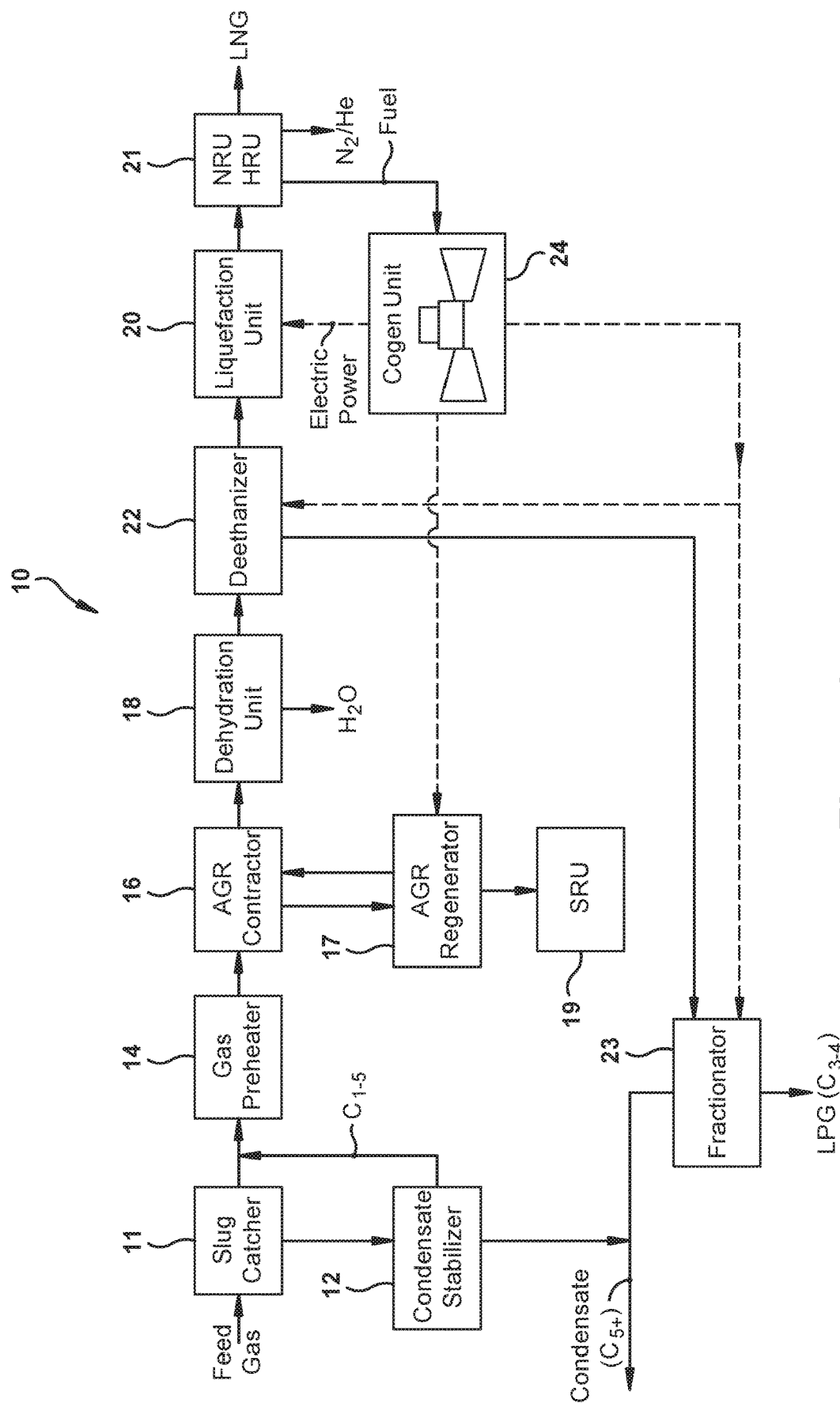
FIG. 1 shows a schematic diagram of a LNG production train of a liquefaction plant in which aspects of the present invention may be practiced.

Example embodiments of the invention will be described more fully hereinafter with reference to the accompanying drawings, in which some, but not all embodiments are shown. Indeed, the invention may be embodied in many different forms and should not be construed as limited to the embodiments set forth herein; rather, these embodiments are provided so that this disclosure will satisfy applicable legal requirements. Like numbers may refer to like elements throughout.

As used herein and in the claims the phrase "liquefaction plant" means a hydrocarbon fluid processing plant that includes processing a feed stream which comprises gaseous methane into a product stream that includes liquid methane. For example, a liquefaction plant may include a cryogenic heat exchanger, refrigerant compressors and/or an expansion step. A liquefaction plant may optionally include other fluid processing steps. Non-limiting examples of such fluid processing steps include feed purification processing steps (liquids removal, hydrogen sulfide removal, carbon dioxide removal, dehydration), product purification steps (helium removal, nitrogen removal), and non-methane product production steps (deethanizing, depropanizing, sulfur recovery). One example of a liquefaction plant includes, for example, a plant that converts a gaseous feed stream containing methane, ethane, carbon dioxide, hydrogen sulfide and other species into liquefied natural gas, which contains methane and reduced amounts of other non-methane species as compared to the feed stream. As stated, a liquefaction plant may include one or more LNG production trains.

According to aspects of the present invention, systems and methods are disclosed which may be used to enhance or optimize the performance of a liquefaction plant, including the LNG production trains that make up the liquefaction plant and/or the subsystems of the LNG production trains, such as thermal power generating units. In exemplary embodiments, this enhancement or optimization may include an economic enhancement or optimization that provides decision criteria or other input toward the making of decisions, which may be automated or include the operator approval, between alternative modes of operation so to enhance or optimize profitability. Configurations of the present invention, as described below, also may provide computer-implemented methods and apparatus for modeling the liquefaction plant and the production trains and other subsystems thereof. Technical effects of some configurations of the present invention include the generation and solution of system models that predict performance under varying physical, operational, and/or economic conditions. Exemplary embodiments of the present invention combine a plant model that predicts performance under varying ambient and operational conditions with an economic model that includes economic constraints, objectives, and market conditions so to optimize profitability. In doing this, the optimization system of the present invention may predict optimized operating modes that maximize profitability for particular combinations of ambient, operational, contractual, regulatory, legal, and/or economic and market conditions. The present invention enables the economic valuation of an initial physical or operating control and can value the economic impacts of available design or operating controls or control points. Further, that the economically optimized control and design is enabled for one or multiple time periods under consideration from the instant to a lifecycle.

For exemplary purposes, a general arrangement of one type of hydrocarbon fluid processing plant will be described with reference to FIG. 1, which depicts an exemplary LNG production train 10, one or more of which may be included within an exemplary liquefaction plant. As shown, the LNG production train 26 may consist of several discrete processing sections. According to an exemplary configuration, these processing sections may include: an inlet section; a gas treatment section; and a gas liquefaction section. As provided herein, each of these sections may be carried out in one or more process modules or components, which is a system most easily understood through reference to the exemplary LNG production train 26 of FIG. 1 in the discussion to follow.

As illustrated in FIG. 1, a stream or feed gas may be received within an inlet section, which includes certain process modules that, in general, function to separate the gas from liquid water and any hydrocarbon liquids (condensate) that may be present. The inlet section also may function to stabilize the condensate into a salable product. According to an exemplary configuration, the inlet section may consist of a slug catcher unit 11, various separation vessels (not shown), a condensate stabilizer unit 12, an off-gas compressor unit (not shown) that is used to return the condensate stabilizer off-gas to the main gas stream, and a feed gas preheater 14. Moving through these components, the stream of feed gas is initially passed through the slug catcher 11 and separation vessels to remove the bulk of the components that tend to cause freezing and plugging problems during the later cryogenic process. Condensed liquids (gas condensate) separated from the feed gas stream are generally at high pressure, such as 500-1000 psig, and contain significant amounts of dissolved methane and ethane. For transportation and subsequent use, the condensate is typically stabilized within the condensate stabilizer unit 12. That is, the vapor pressure may be reduced, typically below atmospheric pressure. As will be appreciated, removing the light hydrocarbons to lower the vapor pressure increases the heating value of the condensate product, while it also reduces potential problems caused by later off-gassing of the light components as the pressure and temperature of the condensate change during transport and storage.

From the inlet section, the feed gas is directed through the gas treatment section. As shown, the major functional areas and process modules within this section are an acid gas removal (AGR) system, which includes an AGR contactor unit 16 and AGR regenerator unit 17. The gas treatment section may further include a module for absorbing mercury (not shown), as well as a dehydration unit 18. A variety of processes may further be included for treating the gas to remove acid gases, such as $H_2S$ and $CO_2$. For example, one process for treating an acidic gas stream involves contacting the gas stream in a contactor vessel with a solvent (for example, organic amines, such as methyldiethanolamine), which absorb the acid gases and thereby remove them from the feed gas.

In order for processes of this type to be economical, the "rich" solvent must be regenerated in the AGR regenerator unit 17 so that it can be reused in the treatment process. That is, the acid gases (both $CO_2$ and $H_2S$) and the hydrocarbons must be removed or substantially reduced in the rich solvent before being reused in the process. The rich solvent, thus, may be regenerated by passing it into a regenerator vessel where substantially all acid gases are removed, after which the regenerated solvent is returned for use in the treatment process. A sulfur product may then be recovered from the $H_2S$ by processing the recovered acid gas stream through a sulfur recovery unit (SRU) 19. As will be appreciated, several processes have been developed for direct conversion of $H_2S$ to elemental sulfur. Most conversion processes are based on oxidation-reduction reactions where $H_2S$ is converted directly to sulfur. In large liquefaction trains, the Clause process may be used to convert $H_2S$ to sulfur by "burning" a portion of the acid gas stream with air in a reaction furnace.

A dehydration unit 18, using molecular sieves and/or glycol processes for example, then may be used to remove $H_2O$ to a dew point level compatible with the LNG product temperature of around −260° F. According to one example, dehydration adsorbent vessels may be comprised of parallel vessels which cycle from dehydrating the stream of feed gas to a regenerating mode.

From there, the feed gas may be directed to the gas liquefaction section. The gas liquefaction section includes a liquefaction unit 20, which, for example, contains one or more cryogenic heat exchanger units and, optionally, one or more pre-cooling heat exchanger units for cooling the natural gas stream by heat exchange with one or more refrigerants. The heat exchangers used in the cryogenic heat exchanger unit may be, for example, spiral wound heat exchanges, sometimes referred to as spool wound heat exchangers, or brazed aluminum, plate-fin heat exchangers, or other conventional types. As part of this process, refrigerant compression units (not shown) may take the evaporated refrigerant exiting the cryogenic heat exchangers and/or pre-cooling heat exchangers and compress it to a pressure sufficient for its condensation and re-use. Such liquefaction plants may have one or more refrigerant compression circuits that use single component refrigerants (e.g. propane) or mixed refrigerants (e.g. methane, ethane and propane). Where two or more refrigerant circuits are employed the respective circuits may cool the natural gas stream in series, in parallel, or in a cascade arrangement where one refrigerant circuit is used to cool a second refrigerant, which in turn cools the natural gas stream.

Although many types of refrigeration cycles may be used to liquefy natural gas, the following three are most common: (1) "cascade cycle" which uses multiple single component refrigerants in heat exchangers arranged progressively to reduce the temperature of the gas to a liquefaction temperature, (2) "expander cycle" which expands gas from a high pressure to a low pressure with a corresponding reduction in temperature, and (3) "mixed refrigeration cycle" which uses a multi-component refrigerant in specially designed heat exchangers. Most natural gas liquefaction cycles use variations or combinations of these three basic types. A mixed refrigerant gas liquefaction system involves the circulation of a multi-component refrigeration stream, usually after precooling with propane or another mixed refrigerant. An exemplary multi-component system may comprise methane, ethane, propane, and optionally other light components. Without precooling, heavier components such as butanes and pentanes may be included in the multi-component refrigerant. Mixed refrigerants exhibit the desirable property of condensing and evaporating over a range of temperatures, which allows the design of heat exchange systems that can be thermodynamically more efficient than pure component refrigerant systems.

Another optional component of the gas liquefaction section is a distillation tower, such as a scrub tower (not shown), demethanizer unit (not shown), or deethanizer unit 22. The deethanizer unit 22 may function to remove pentane and heavier components from the feed gas to prevent freezing in the cryogenic heat exchangers. When present, some LNG production plants use the demethanizer or deethanizer unit to produce some natural gas liquids as separate products. For example, natural gas leaving the dehydration unit 18 may be fractionated. In this case, part of the $C_{3+}$ hydrocarbons containing at least three carbon atoms are separated from the natural gas by means of a deethanizer distillation column. The light fraction collected at the top of the deethanizer column may be passed to the liquefaction unit 20, with the liquid fraction collected at the bottom of the deethanizer column being sent to a fractionation unit 23 for recovery of $C_{3-4}$ liquid petroleum gas (LPG) and $C_{5-}$ liquid (condensate). As will be appreciated, this arrangement is preferred if the LPG product is intended to be sold separately. In locations where the feed gas has a low LPG content or the LPG has low value, the deethanizer column may be replaced by a scrub tower which removes pentane and heavier hydrocarbons to a specified level.

At the end of the liquefaction section, the liquefied natural gas may be treated to remove nitrogen or helium within, respectively, a nitrogen recovery unit (NRU) and helium recovery unit (HRU) 21, if any is present. As will be appreciated, a large portion of the nitrogen that may be present in natural gas is typically removed after liquefaction since nitrogen will not remain in the liquid phase during transport of conventional LNG and having nitrogen in LNG at the point of delivery is undesirable due to typical sales specifications. For storage and/or shipping, the pressure of the liquefied natural gas is usually decreased to near atmospheric pressure. Such pressure reduction is often called an "end flash" reduction, resulting in end flash gas and LNG. An advantage of such an end flash reduction is that low boiling components, such as nitrogen and helium, are at least partially removed from the LNG along with some methane. The end flash gas may be used as fuel gas in a cogeneration plant 24 or for gas turbine drivers, steam boilers, fired heaters, or other areas as required, or may be flared. The helium recovery is optional depending on the amount of helium in the natural gas feed stream and the market value of helium.

As discussed in more detail with reference to FIG. 2, the LNG production train may include one or more cogeneration units 24 that generate the energy used within the LNG plant at a reduced cost. According to preferred embodiments, the LNG production train 10 has a cogeneration unit 24 in which a gas turbine is used to drive a generator to generate electricity for supplying the energy demanded by the LNG production train 10, particularly the high-energy processes within the liquefaction unit 20. Any excess electrical power generated by the cogeneration unit 24 can be sold to a power company or used in other applications within the LNG plant (as indicated by the dashed lines), and additional electrical power may be purchased from the power company only to the extent necessary to supplement the amount of electrical power produced by the cogeneration unit 24. Wastes such as heat loss may be reduced by utilizing the heat generated as a result of production of electrical power for supplying or at least contributing to the heat and/or cooling demands for the plant. Heat produced as a result of operation of the gas-fired turbine may be extracted from the exhaust gases by way of a heat exchanger and used in supplying heating demands for the plant, such as steam. Alternatively, the steam generated from this process is used to generate more electricity in a steam-driven turbine-generator.

Figure 2:
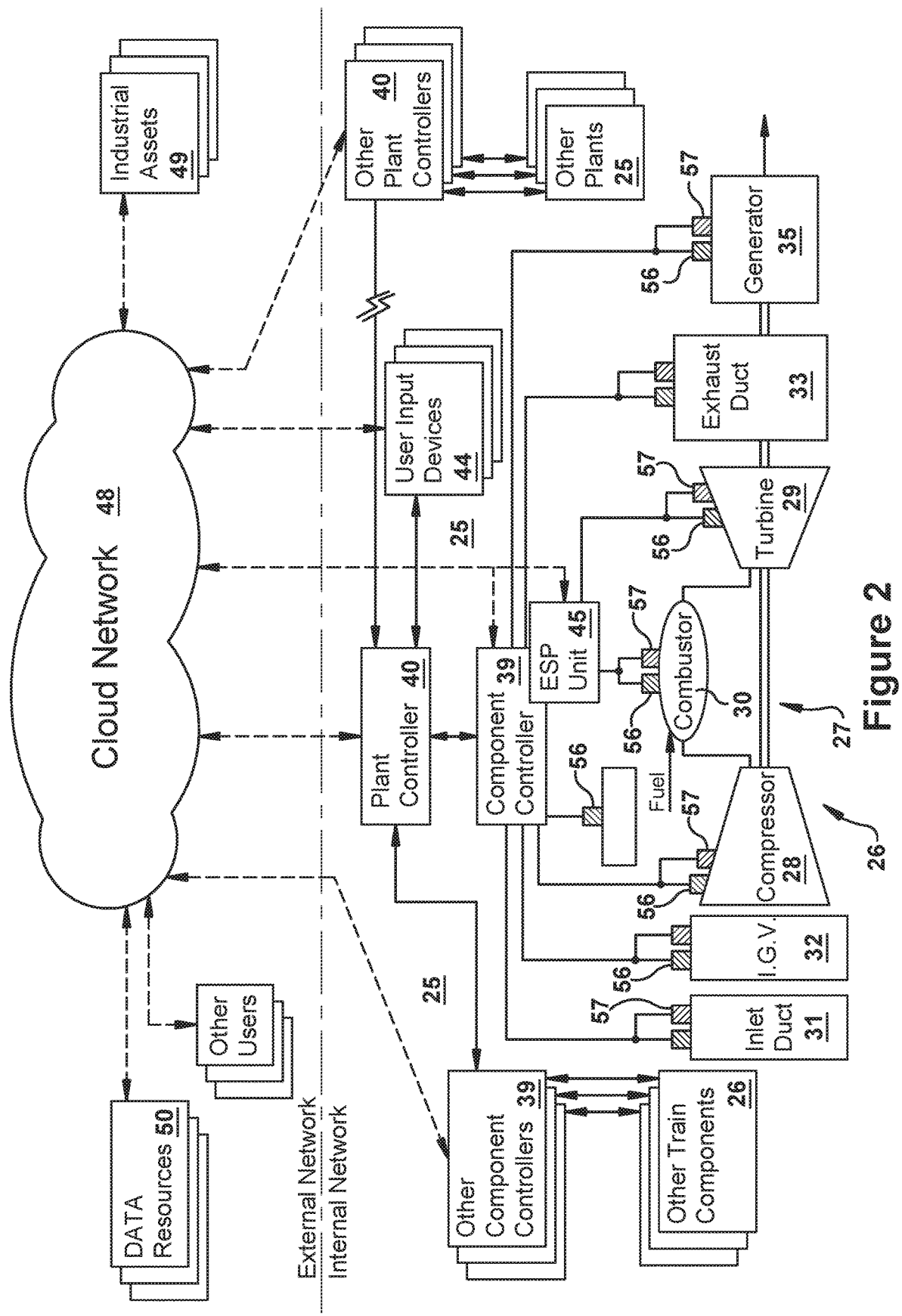
FIG. 2, with reference to an exemplary gas turbine, schematically illustrates an exemplary monitoring and control system in accordance with the present invention as may be used in conjunction with each of the train components within an LNG production train.

FIG. 2 is a schematic diagram of an exemplary industrial asset, facility or plant—herein "plant" or "plant 25". The plant 25 may include any number of plant subsystems, generating units, or other components—which may also be referred to "train components" or "train components 26". In this case, for example, the plant 25 may be a LNG production train, such as the one introduced in FIG. 1, or a liquefaction plant having several such LNG production trains. One of the train components 26 may be a combustion or gas turbine engine or system—herein "gas turbine" or "gas turbine 27". As discussed in relation to FIG. 1, the gas turbine 27 may be employed as a cogeneration unit in a LNG production train. It should be understood that FIG. 2 is provided as an exemplary system by which operational data may be gathered within any of the train components 26 and used for the management thereof. Thus, as provided herein, the present invention anticipates that each of the aforementioned train components within the exemplary LNG production train 10 may be similarly connected as that shown in FIG. 2. In this manner, the various train components may be connected to computer-implemented control systems and communication networks for the control and optimization of performance pursuant to analytics, processes, and other functionality described herein. For example, within such control systems, gathered operational data may be provided electronically to computer-implemented analytics, data repositories, plant or component controllers, cloud-based services, and/or user input devices so to enable a variety of functions, for example, deriving control setpoints related to the operation of the train component, data storage/recall, generating user interfaces, prompting/obtaining user input, decision support for long-term and short-term operations, automated control responses, etc. As will be appreciated, such control systems may send/receive electronic communications to/from each of the systems, subsystems, components, sensors, actuators, and/or other equipment within the plant 25 and/or train component 26, as well as manipulate control settings related thereto in a manner consistent with the functionality described herein.

Referring now with specificity to FIG. 2, the gas turbine 27 may include a combustion turbine engine that, in general, operates by extracting energy from a pressurized flow of hot gas produced by the combustion of fuel in a stream of compressed air. As shown, the gas turbine 27 may include an axial compressor 28 that is mechanically coupled by a common shaft to a downstream turbine section or turbine 29, with a combustor 30 being positioned therebetween. In one example of operation, the rotation of compressor rotor blades compress a flow of air within the compressor 28. Then, energy is released in the combustor 30 when the compressed airflow is mixed with a fuel and ignited. The resulting flow of hot gases or "working fluid" is then directed over rotor blades within the turbine 29, which induces the rotation of the shaft. In this way, the energy of the fuel is transformed into the mechanical energy of the rotating shaft, which then may be used to drive the rotation of the compressor rotor blades, so to produce the supply of compressed air, as well as turn the coils of a generator to produce electricity. The gas turbine 27 may be part of a complex system that includes many other subsystems and components. For example, as further shown, the gas turbine 27 may include an inlet duct 31 that channels ambient air into the compressor 28. From there, the ingested air may flow through inlet guide vanes 32, which operate to desirably condition airflow as it enters the compressor 28. In addition, the gas turbine 27 may include an exhaust duct 33 that channels combustion gases from an outlet of the turbine 29 through, for example, emission control and sound absorbing devices. Other subsystems and components also may be present. Finally, the gas turbine 27 may include a generator 35 that is operably connected to the common shaft of the gas turbine for converting the rotation thereof into electricity.

The gas turbine 27 further may include a control system or controller, which will be referred to herein as a controller or component controller 39, that monitors and controls the operation of the engine. As an example, the component controller 39 may be a Mark VI™ Turbine Control System from General Electric, which is designed to fulfill a variety of control requirements for such engines as well as protect against adverse or abnormal operating conditions. The component controller 39, thus, may perform many functions, including fuel, air and emissions control, sequencing of turbine fuel for start-up, shut-down and cool-down, synchronization and voltage matching of the generator, monitoring of all gas turbine control and auxiliary functions, and protection against unsafe and adverse operating conditions, as well as any other functionality which may be described or implied herein. As also shown, in cases where the gas turbine 27 is part of a larger plant—such as a LNG production train 10 or liquefaction plant—the component controller 39 may connect to a plant controller 40 that controls the operation of the plant 25. As discussed more below, each of the component controller 39 and plant controller 40 may include a computer system having digital processing resources or processing capabilities—herein "processor"—as well as data storage or memory capabilities—herein "memory". Alternatively, the component controller 39 and/or the plant controller 40 may be combined into a single controller having an integrated architecture. The component controller 39, plant controller 40, and the computer system related to each—also referenced collectively herein as "controllers"—may connect to user interface or input devices—herein "user input devices" or "user input devices 44". Such connections, as illustrated, may be made either through internal or external networks. The user input devices 44 may be used to receive and send communications from/to any of the personnel associated with the operation of the plant 25 or train component 26. It should be understood that such user input devices 44 may include any conventional computer-implemented device having a user interface, without limitation, including mobile devices and other workstations whether locally or remotely disposed relative to the location of the plant 25 or train component 26. As also shown in FIG. 2, several other train components 26 may be provided, each of which may include a component controller 39 that connects to or is integrated with the plant controller 40. The plant controller 40 may further connect to other plant controllers 40 associated with the operation of other plants 25.

As stated, each of the component controller 39 and plant controller 40 may include a computer system. It should be understood that such computer systems may include one or more processors, memory, and other conventional computing components necessary given any of the functionality described herein. As further anticipated by the present application, the computer systems related to the component controller 39 and plant controller 40 may include non-local aspects distributed throughout the several other resources or nodes depicted throughout FIG. 2, as will be described in more detail to follow. For example, these other nodes may include, without limitation: a communication network, cloud or cloud-based platform—herein "cloud network 48", or generally "cloud"; data repositories or other informational resources—herein "data resources" or "data resources 49"; the several user input devices 44; and other linked component controllers, plant controllers, and industrial assets 50. Therefore, it should be understood that the consolidated and local depiction of the component controller 39 and plant controller 40 in FIG. 2, as well as the computer systems, processors, and memory resources related to each, is merely exemplary and not meant to limit the manner in which any functionality described herein is performed or executed, unless otherwise expressly stated. Along these lines, it should be further appreciated that reference to the component controller 39, the plant controller 40, and/or the computer systems associated with each may include computing resources, such as processing, storage, memory, data and communication devices, which are distributed and accessible via internal or plant level networks as well as the cloud or cloud network 48, as would be understood by one of ordinary skill in the art given a distributed computing environment and the functionality described herein, whether that functionality be expressly stated or implied.

The gas turbine 27, as well as the other train components 26 within the LNG production train, such as those shown in FIG. 1, may include multiple sensors 56 that are configured to monitor particular operational aspects. For example, in regard to the gas turbine 27, the sensors 56 may detect or measure various operating conditions or parameters throughout the engine and its subsystems, including, for example, within the compressor 28, turbine 29, combustor 30, generator 35, ambient environment 33, etc. For example, the sensors 56 may include temperature sensors that monitor ambient temperature, compressor discharge temperature, turbine exhaust temperature, and other temperatures along the working fluid flowpath through the gas turbine 27. The sensors 56 may further include acoustic or pressure sensors that monitor ambient pressure, static and dynamic pressure levels at the compressor inlet, compressor outlet, turbine exhaust, and at other suitable locations within the gas turbine 27. The sensors 56 also may include humidity sensors that measure ambient humidity in the inlet duct 31 of the compressor 28. The sensors 56 also may include flow sensors, velocity sensors, acceleration sensors, flame detector sensors, valve position sensors, guide vane angle sensors, as well as any other conventional sensor anticipated given the functionality described herein that may be used to measure various parameters and conditions relative to the operation of the gas turbine 27. As used herein, the term "parameter" refers to measurable physical properties of operation which may be used to define operating conditions within a system, such as the gas turbine 27 or other system described herein. Such operating parameters may include those just described, including, without limitation, temperatures, pressures, humidity, and gas flow characteristics at locations defined along the path of the working fluid, as well as ambient conditions, fuel characteristics, and other measurables, as may be described or implied by any of the functionality described herein.

The gas turbine 27, as well as the other train components 26 within the LNG production train, such as those shown in FIG. 1, also may include several actuators 57 by which control of the gas turbine 27 is achieved. For example, such actuators 57 may include electro-mechanical devices having variable setpoints or settings that allow for the manipulation of certain process inputs—herein "manipulated variables"—for the control of process outputs—herein "controlled variables"—in accordance with a desired result or mode of operation. The control of the manipulated variables via the actuators 57 must take into account other non-controllable variables—herein "disturbance variables"—which also affect the operation of the gas turbine 27. Thus, for example, commands generated by the controller the component controller 39 may cause one or more actuators 57 within the gas turbine 27 to adjust valves between a fuel supply and the combustor 30 to regulate flow level, fuel splits, or fuel type. As another example, commands generated by the component controller 39 may cause one or more actuators 57 to adjust a setting that changes an angle of orientation of the inlet guide vanes 32 and thereby affects the airflow entering the compressor 28.

Thus, in accordance with exemplary embodiments, the computer systems of the component controller 39 and/or plant controller 40 may execute code or software that is configured to control the gas turbine 27 and/or LNG production train 10 pursuant to a desired mode of operation. Such control may be responsive to operational data supplied by the sensors 56 as well as to instructions received from the user input devices 44, and such control may be implemented via manipulating one or more of the actuators 57. In furtherance of this, the user input devices 44 may be accessed and used by plant managers, technicians, engineers, operators, energy traders, owners, and/or any other stakeholder, as may be described or implied by any of the functionality provided herein. The software executed by the computer system may include scheduling algorithms for regulating any of the systems or subsystems described herein. For example, the software may enable the component controller 39 to control the operation of the gas turbine 27 based, in part, on algorithms stored in the memory of the component controller 39. These algorithms, for example, may maintain a firing temperature of the combustor to within predefined limits. It will be appreciated that algorithms may include inputs for parameter variables such as compressor pressure ratio, ambient humidity, inlet pressure loss, turbine exhaust backpressure, as well as any other suitable parameters. The software may include schedules and algorithms that accommodate variations in ambient conditions that affect emissions, combustor dynamics, firing temperature limits at full and part-load operating conditions, etc. As discussed in more detail below, the executed software may further apply algorithms for scheduling the gas turbine, such as those settings relating to desired turbine exhaust temperatures and combustor fuel splits, with the objective of satisfying performance objectives while complying with operability boundaries of the engine. For example, the computer system of the component controller 39 may determine combustor temperature rise and NOx during part-load operation in order to increase the operating margin to the combustion dynamics boundary and thereby improve operability, reliability, and availability of the unit.

As further shown, the gas turbine 27 may include one or more event stream processing ("ESP") units 45. As discussed in more detail below, the ESP unit 45 may be configured as an "edge computing device" through which raw data from one or more of the sensors 47 is streamed before such data is aggregated, transformed, and/or materially processed for efficient ingestion and use by the component controller 31. The ESP unit 45 may be integrated into the component controller 31 or made a separate device, and, as discussed more below, may include one or more analytic units for detecting anomalies in an incoming stream of raw data. As will be appreciate, such analytic units or edge devices may be used to detect precursors that signal operational anomalies as well as enable particularly rapid control responses so that harmful anomalies may be avoided.

The computer systems of the component controller 39, plant controller 40, and/or ESP unit 45 may be connected to the cloud or cloud network 48 and, via this connection, data, instructions, communications, software, and other information may be exchanged. The cloud network 48 further may include connections, computational resources, data storage, analytics, platform services, as well as other functionality as may be described or implied herein. The cloud network 48 may include an external network that connects remote industrial assets or plant, as well as a component level network (referred to in FIG. 2 as an "internal network") to other resources, such as other users, other industrial assets 49, and data resources 50. The connections made between the cloud network 48 and any of the other nodes of FIG. 2 may be wired or wireless and/or inclusive of any conventional communication systems or devices. As will be appreciated, the cloud network 48 may be part of a larger communication system or network, including the Internet and/or one or more private computer networks, that has a distributed architecture. In this manner, the component controller 39 and plant controller 40 may receive information, data, and instructions from and/or send information, data, and instructions to data resources 49. Connection to such data resources 49 may be made via the cloud network 48 or, alternatively, one or more of resources of the data resources 49 may be stored locally and be accessed outside of the cloud network 48 via a private or internal network. Additionally, as discussed more below, the cloud network 48 may connect the gas turbine 27 to other industrial assets 50, such as other remote gas turbines, LNG production trains, or liquefaction plants, or the facilities of suppliers or customers.

As used herein, the data resources 49 may include several types of data, including but not limited to: market data, operating data, and ambient data. Market data, for example, may include information on market conditions, such as energy or LNG sales price, fuel costs, labor costs, regulations, etc. Operating data, for example, may include information relating to the operating conditions of the LNG production train or the gas turbine 27 or related components. Such operating data may include temperature or pressure measurements, air flow rates, fuel flow rates, etc. within the gas turbine 27. Ambient data, for example, may include information related to ambient conditions at the plant, such as ambient air temperature, humidity, and/or pressure. Market, operating, and ambient data each may include historical records, present condition data, and/or data relating to forecasts. For example, data resources 49 may include present and forecast meteorological/climate information, present and forecast market conditions, usage and performance history records about the operation of the LNG production train and/or gas turbine 27, and/or measured parameters regarding the operation of other similarly situated LNG production trains and/or gas turbines, which may be defined as those having similar components and/or configurations. Any other data that is described or implied by the functionality described herein may also be stored and recalled from data resources 49.

Thus, according to exemplary embodiments, it should be understood that, while each of the component controller 39 and plant controller 40, as well as the ESP unit 45, may include computer systems having a processor, memory, databases, communication devices, and other computing resources, it should be appreciated that these resources may be distributed, for example, across any of the several nodes depicted in FIG. 2, including the ESP unit 45, component controller 39, plant controller 40, user input devices 44, cloud network 48, data resources 49, other industrial assets 50, etc. That is, certain aspects the component controller 39 and plant controller 40 may be locally disposed, while other aspects are remote and operationally connected via the cloud network 48, as indicated by the dotted lines of FIG. 2. As stated, the component controller 39 and plant controller 40—also referenced collectively herein as "controllers"—may be connected to each piece of equipment, subsystem, or component within the plant, including the gas turbine 26 and related subsystems, such that the sensors 56 deliver data to the controllers and the actuators 57 are response to commands received from the controllers. Unless otherwise stated, however, present systems and methods may include embodiments that are not configured to directly control the gas turbine or other train component and/or to directly measure operating conditions. In those presently described embodiments that do directly measure/control operation of the gas turbine or other train component, such control may be made pursuant to a "control program", which may be stored, in whole or in part, within the memory of the computer systems of the component controller 39 and/or plant controller 40 and, when operated, makes the computer systems thereof manage data and perform the processes, analytics, and logic as provided herein.

More specifically, according to one exemplary manner of operation, a processor of the computer systems of the controllers executes a "program code" that defines the control program. While executing the program code, the processor may process data, which may result in reading and/or writing transformed data from/to memory. Displays on the user input devices 44 may enable a human user, such as any of those described herein, to interact with the computer system using any type of communications link, such as may be provided by the cloud network 48. As will be appreciated, the cloud network 48 may enable the computer system to communicate with any of the other devices described herein, regardless of location. To this extent, the control program of the present invention may manage a set of interfaces that enable several users to interact with the control program. Further, the control program, as discussed below, may manage (e.g., store, retrieve, create, manipulate, organize, present, etc.) data, such as control data or operational data. The controllers may include one or more general purpose computing articles of manufacture capable of executing the program code of the control programs once it is installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, the program code may include object code, source code, and/or executable code, and may form part of a computer program product when on computer readable medium. It is understood that the term "computer readable medium" may comprise one or more of any type of tangible medium of expression, now known or later developed, from which a copy of the program code may be perceived, reproduced, or otherwise communicated by a computing device. As will be appreciated, when the computer executes the program code, it becomes an apparatus for practicing the invention, and on a general-purpose microprocessor, specific logic circuits are created by configuration of the microprocessor with computer code segments. For example, a technical effect of the executable instructions may be to implement a control method and/or system and/or computer program product that uses models to enhance, augment or optimize operating characteristics of industrial assets to improve economic return given a set of constraints, such as ambient conditions, market conditions, performance parameters, life cycle costs, etc. In addition to using current information, historical and/or forecast information may be employed, and a feedback loop may be established to dynamically operate the train component and/or plant more efficiently during fluctuating conditions. The computer code of the control program may be written in computer instructions executable by the computer systems of the controllers. To this extent, the control program executed by the controllers and/or other distributed computer resources may be embodied as any combination of system software and/or application software. Further, the control program may be implemented using a set of modules. In this case, a module may enable the controllers to perform a set of tasks used by control program, and may be separately developed and/or implemented apart from other portions of control program. As will be appreciated, when the computer system executing the control program includes multiple computing devices, such as previously described, each computing device may have only a portion of control program or program code fixed thereon.

Thus, generally, the control program may enable computing and digital resources—such as those specifically described herein or which may be generally referred to as a "computer system"—to implement a component controller or plant controller in accordance with the functionality provided here, particularly those figures to follow that include data flow diagrams, algorithms, methods, analytics, and/or logic. For the purposes herein, such a computer system may obtain data via any conventional means. For example, such a computer system may generate and/or be used to generate train component or plant control data, retrieve train component or plant control data from one or more data stores, repositories or sources, receive train component or plant control data from other systems or devices in or outside of the locality of the train component or plant. In other embodiments, the present application provides methods of providing a copy of the program code, such as for executing the control program, which may include the implementation of some or all the processes described herein. It should be further understood that aspects of the present invention may be implemented as part of a business method that performs a process described herein on a subscription or fee basis. For example, a service provider may implement the control program at a customer train component or plant. In such cases, the service provider may manage the computer system or controllers that performs one or more of the processes described herein for the customer facility.

Thus, it should be appreciated that aspects of the present application relate to what is often referred to as the "Industrial Internet of Things" ("IIoT"), which generally refers to the leveraging of growing industrial connectedness toward the enhanced management of industrial assets, such as the plant and train components introduced above. More specifically, the IIoT connects industrial assets to the Internet or a cloud-based or "cloud" computing environment, such as the previously discussed cloud network 48 of FIG. 2. The IIoT further links industrial assets to each other in some meaningful way, carrying information therebetween and remotely to other cloud resources and user input devices, so that more effective ways to manage those industrial assets are enabled and realized. This, for example, may be achieved by insights that would otherwise go unnoticed but for the interconnectedness fostered by the IIoT. By way of a simplified example, the cloud, relative to the IIoT, may include a computing system having one or more processors, one or more databases, a plurality of users and/or industrial assets that are in data communication through the computing system, and one or more modules configured to perform a specific task. Such tasks, for example, may relate to asset maintenance, performance analytics, data storage and transfer, security, or other functions as provided herein. Present systems and methods, thus, should be understood in this context, where cloud resources associated with the IIoT may be used to receive, relay, transmit, store, analyze, or otherwise process data and information for or about one or more connected industrial assets.

It should be understood, however, that the integration of industrial assets with such remote computing resources toward the enablement of the IIoT often presents technical challenges separate and distinct from the specific industry and from computer networking, generally. For example, a given industrial asset—such as the previously described LNG production train 10 or gas turbine 27—may require configuring with novel interfaces and communication protocols to send and receive data to and from cloud resources. Further, because industrial assets typically have strict requirements for cost, weight, security, performance, signal interference, and the like, the enablement of such interfaces or protocols is rarely as simple as combining or connecting the industrial asset with a general-purpose computing device. Thus, to address these and other problems resulting from the intersection of certain industrial fields and the IIoT, embodiments of the present invention may enable improved interfaces, techniques, protocols, and/or analytics for facilitating communication with and configuration of industrial assets via remote computing platforms and frameworks. Solutions in this regard may relate to improvements that address challenges related to specific types of industrial assets (e.g., LNG production trains, gas turbines, aircraft engines, wind turbines, locomotives, combined cycle power plants, etc.), or to improvements that correspond to particular problems related to the use of industrial assets with remote computing platforms and frameworks, or, for that matter, to improvements that address problems related to the operation of the cloud-based platform itself via improved mechanisms for configuration, analytics, and/or remote management of industrial assets.

By way of example, the Predix™ platform available from General Electric is one such cloud-based platform that includes systems and methods relating to the management of industrial assets. As will be appreciated, the Predix™ platform is brought about by state of the art tools and cloud computing techniques that enable incorporation of a manufacturer's asset knowledge with a set of development tools and best practices for the purposes of spurring innovation. The Predix™ platform, thus, represents a purpose-built cloud-based platform for developing, deploying, operating, and monetizing cloud-based applications related to industrial assets. With this, General Electric has effectively combined cutting-edge technology and decades of industry experience to construct a platform that securely ingests machine-grade data at scale and analyzes it to deliver timely outcomes. Through the use of such systems and methods, manufacturers of industrial assets may more effectively leverage the unique understanding of the assets they build so to foster insights that bring additional value to customers. Optimized for the unique and demanding requirements of industrial applications, Predix™ is flexibly configured to work with operating assets from a range of vendors and vintages, and is sufficient to capture and analyze the unique volume, velocity, and variety of machine data now generated across the industrial world within a secure, industrial-strength cloud environment. Therefore, it should be understood that the Predix™ platform may serve as a component and/or enabler of those presently described embodiments that relate to the design, operation, and/or management of industrial assets within the IIoT, allowing users to bridge gaps between software and operations to enhance asset performance, optimize operations, foster innovation, and, ultimately, provide greater economic value. The Predix™ platform, for example, may serve as a component and/or enabler of aspects of the previously described cloud network 48 of FIG. 2, and the various digital, computing, and communication resources associated therewith, without limitation, and may be deployed in accordance with the functionality described herein.

Figure 3:
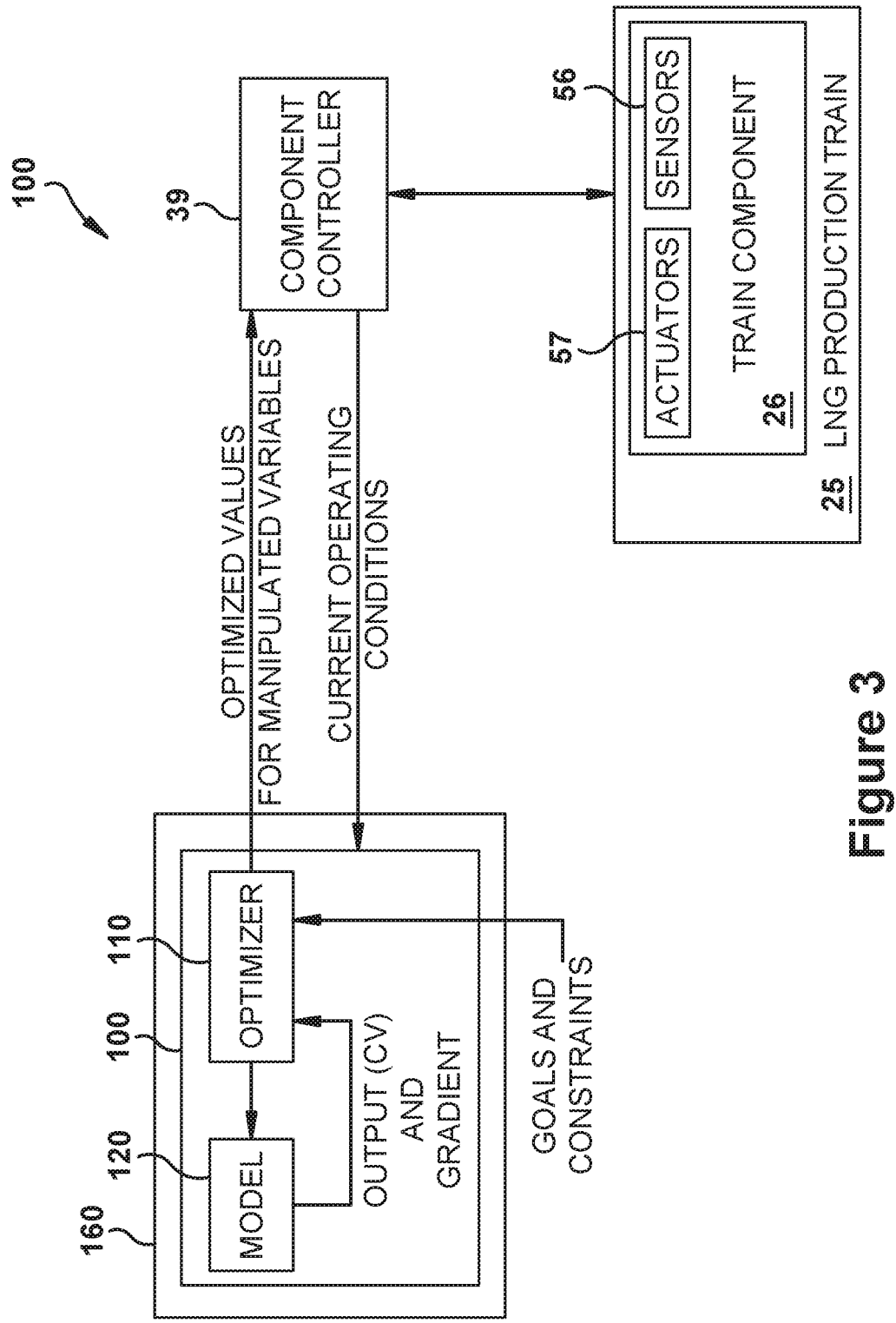
FIG. 3 is an optimizer that may be associated with the control system according to exemplary embodiments of the present invention.

FIG. 3 illustrates a block diagram of an optimization system 100, which be connected to and/or be used in conjunction with the component controller 39 discussed above in relation to FIG. 2. In the illustrated embodiment, the optimization system 100 includes an optimizer 110 and a model 120, each of which are described in greater detail below. According to certain embodiments, the model 120 may be a system model of the LNG production train that includes physics-based thermodynamic models that correspond respectively to connected ones of the train components. In accordance with an illustrated embodiment, the optimization system 100 may operate as an advisory controller 160 that communicates with the component controller 39. As described above, the component controller 39 may be a computer-based control system that provides regulatory control of one of the train components 26. The advisory controller 160 also may be a computer system, which, for example, may be integrated with the computer systems associated with the component controller 39 and/or the plant controller 40, and may provide advisory data or recommended actions to the component controller 39. The model 120 may be a computer-implemented model that models the operation of one or more of the train components. It should be understood that in an alternative embodiment, the model 120 may reside on a different computer system than optimizer 110. The user interface devices 44 may provide means by which an operator or user interacts with the advisory controller 160.

The plant 25, which may be a LNG production train, may include one or more train components 26. As already described, each train component 26 may include a plurality of actuators 57 and sensors 56. The actuators 57 may include devices for actuating components such as valves and dampers, while the sensors 56 may include devices for sensing various system parameters (e.g., temperature, pressure, flow rate, and flue gas components) that describe operation. The component controller 39 may receive data from and/or send data to the sensors 56 and the actuators 57 associated with the train component 26.

As will be appreciated, the model 120 may include mathematical representations of the relationships between (a) the manipulated variables and disturbance variables and (b) the controlled variables of the train component 26 or train components 26 that it models. As will be appreciated, manipulated variables represent those variables that may be manipulated by an operator or component controller 39 to affect the controlled variables. As used herein, the disturbance variables refer to those variables that affect the controlled variables, but cannot be manipulated or controlled by an operator or component controller 39, for example, ambient conditions. As will be appreciated, the optimizer 110 may function by determining an optimal set of setpoint values for the manipulated variables given: (1) operating goals or desired objectives for the operation of the train component 26 (for example, in the case of a gas turbine, a load output); (2) operability constraints or limitations associated with operation of the train component 26 (for example, in the case of a gas turbine, emission levels or maximum temperatures within the hot gas path); and (3) current operating conditions (for example, current operating status and/or disturbance variables).

According to an example operation, the optimization system 100, at a predetermined frequency, may obtain the current values of the manipulated variables, controlled variables and disturbance variables from the component controller 39. The communication of these values may commence what is often referred to as an "optimization cycle". As part of this cycle, the optimization system 100 then may use the model 120 to determine an optimal set of setpoint values for the manipulated variables based upon those current conditions (which, as provided herein, may include the determined likelihood of a failure event occurring) and given one or more operating goals and one or more operability constraints. The optimization cycle may be completed when the optimal set of setpoint values, such as may relate to an optimal mode of operation, is communicated to the component controller 39 and/or the plant controller 40. An operator of the LNG production train 25 may have the option of using the optimal set of setpoint values for the manipulated variables. In most cases, the operator allows the computed optimal set of setpoint values for the manipulated variables to be used as setpoints values for control loops. The optimization cycle may run in a closed loop adjusting the setpoints values of the manipulated variables at a predetermined frequency (e.g., as frequently as every 10 seconds or as infrequently as every half hour) depending upon current operating conditions associated with the train component 26.

The model 120 used in conjunction with the optimizer 110 may be developed based upon: 1) known first principle equations describing the system; 2) data, resulting in an empirical model; or 3) a combination of known first principle equations and data. As stated above, the optimizer 110 generally functions by determining the optimal set of setpoint values for the manipulated variables given operating goals, operability constraints, and current conditions. According to exemplary embodiments, these desired operating goals and constraints may be defined in a mathematical expression referred to as a cost function. The optimizer then may determine the optimal set of setpoint values by minimizing the cost function. One common method for minimizing such cost functions is known as "gradient descent optimization." Gradient descent optimization is an algorithm that approaches a local minimum of a function by taking steps proportional to the negative of the gradient of the function at the current point. Because a nonlinear model may be needed to represent the relationship between the inputs and outputs of a train component, the optimizer 110 may include a nonlinear programming optimizer. It should be understood, however, that a number of different optimization techniques may be used depending on the form of the model 120 and the cost function. For example, it is contemplated that the present invention may be implemented by using, individually or in combination, a variety of different types of optimization methodologies, including, but not limited to, linear programming, quadratic programming, mixed integer non-linear programming (NLP), stochastic programming, global non-linear programming, genetic algorithms, and particle/swarm techniques.

With reference now to FIGS. 4 through 8, systems and methods are disclosed for enhancing or optimizing LNG production train and/or train component performance in liquefaction plants, for example, through reducing or minimizing generated flash gas and/or specific energy consumption per unit LNG produced. As provided herein, this may be achieved through constructing an integrated train surveillance system and combining it with defined system/subsystem level performance indicators. According to preferred embodiments, a connected system correlation analysis may then be performed. This analysis may be done, for example, using probabilistic techniques. Finally, real-time optimization or process advisories may be provided to controllers, operators, engineers, plant personnel and/or other plant stakeholders. Alternatively, such advisories may be automatically implemented via a computer-implemented control system.

According to exemplary embodiments, the present invention provides predictive analytics and diagnostics technology, which may be used to manage, control, enhance, and/or optimize maintenance and operations related to the production of LNG. As will be shown, objectives that may be achieved with the present systems and methods include: optimization of process surveillance and tracking of performance indicators (for example, energy, yield, mass balance); performance comparisons between assets in LNG production trains or systems of interest; reduction in the time required for analysis; automation of advisories; as well as other performance enhancing steps. Present methods and systems may further enable insights, identify process improvements and potential failures, enhance user experience by unifying several functions into a single application, and enable scalability by promoting the efficient generation of new modules as need arises. Additionally, as provided herein, methods and systems of the present invention may be used to improve the predictivity of LNG production train performance within liquefaction plants. Such predictive diagnostics may allow plant operators to more effectively use the data that is already being collected to identify problems earlier, prioritize and plan maintenance procedures, reduce maintenance by increasing intervals, limit overtime and equipment-replacement costs, reduce damage to critical equipment, improve production efficiency, and avoid unexpected shutdowns and catastrophic failures. In total, the present invention, as provided herein, may assist LNG production facilities to increase availability, reliability, efficiency, and profitability, and, at the same time, overcome challenges around the scarcity of a skilled workforce, limited budgets, and data overload.

According to one aspect of the present invention, equipment issues may be detected early so to avoid unplanned maintenance outages, optimize maintenance resources, reduce operational risks, and improve performance for the key components within a liquefaction plants. According to exemplary embodiments, the present invention enables early detection of anomalous instrument readings, for example, by identifying patterns in the data that narrow the range of possible diagnoses. As will be appreciated, this functionality may supplement troubleshooting and speed problem solving. In delivering this type of operation, the present invention may include the use of specification sheets or blueprints developed for each of the major equipment or component types within LNG production trains. Such blueprints may contain information on the desired instrumentation, the importance of each piece of equipment, diagnostic rules thresholds and logic, as well as fault patterns. In this manner, the predictive analytics of the present systems and methods, as provided herein, may provide early warnings related to equipment conditions that risk causing damage to the production train. As will be appreciated, such early warnings may allow operators to more effectively reduce operational risk. Present embodiments also may provide early warning of emerging mechanical and performance problems on both rotating and process equipment.

Figure 4:
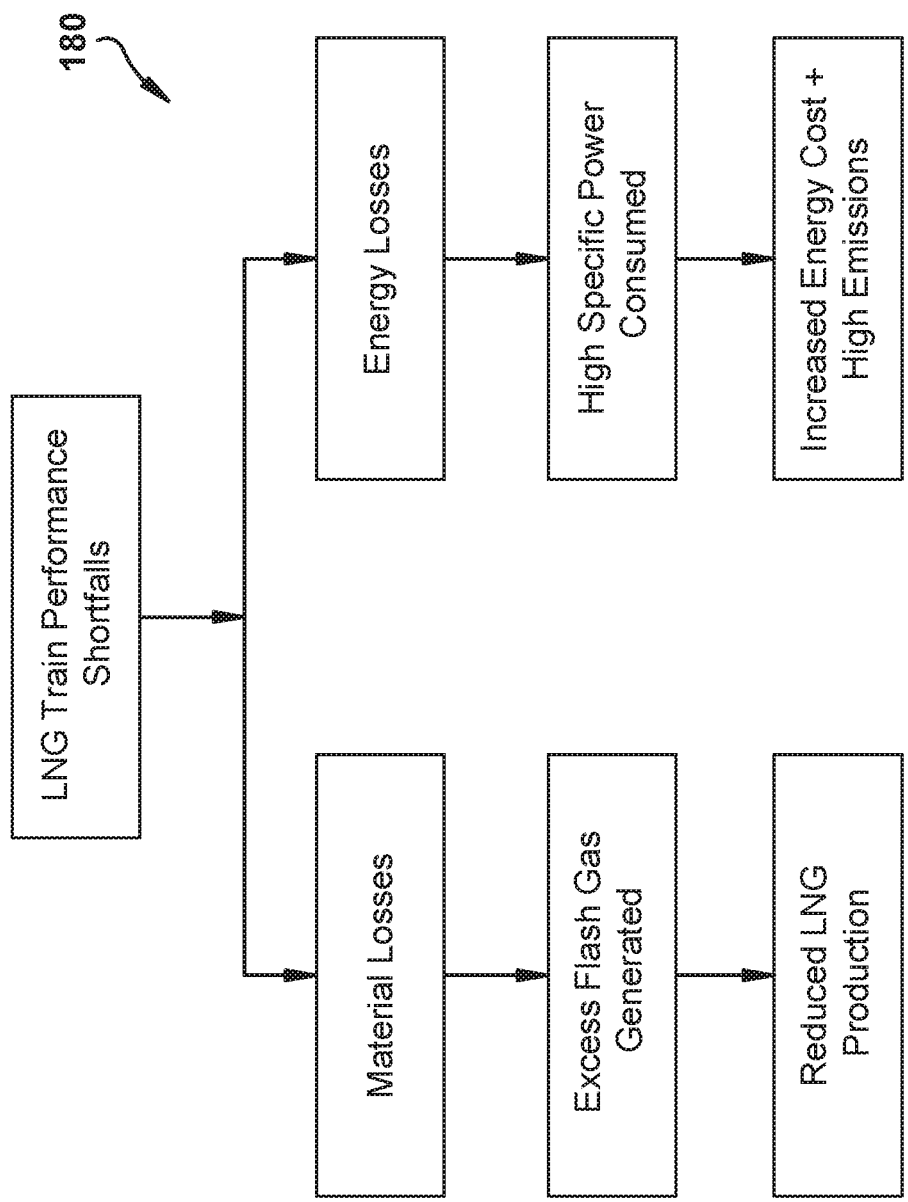
FIG. 4 is a diagram representing the typical types of performance shortfalls for LNG production trains.

With specific reference now to FIG. 4, a diagram 180 is provided that shows two of the significant measures of performance shortfalls in the LNG production process, as each of these will be referred to often herein. As shown, these performance shortfall measures include material and energy losses, each of which negatively impacts LNG production in a specific manner. Material losses involve the generation of excess flash gas. Presently, there are no effective ways for liquefaction plants to recover excess flash gas. Thus, this gas is typically flared to atmosphere and lost, which decreases overall production. In the case of energy losses, these include increased levels of energy input required per unit of produced LNG. The majority of these losses occur within the refrigeration cycle, with the usual causes relating to sub-optimal operation or process violations. Such energy losses result in increased energy costs as well as higher emissions. As will be appreciated, from the initial slug catcher to the final storage of the produced LNG, there are a number of systems, subsystems, components and equipment that make for a highly complex and interrelated production process. While both the hot section (which is the term used to refer to the initial gas processing stages) and cold section (which is the term used to the cryogenic cooling stages) of the LNG production process are each significant, the fact that most of the energy and material losses occur within the cold section requires that this area be given primary attention.

Figure 5:
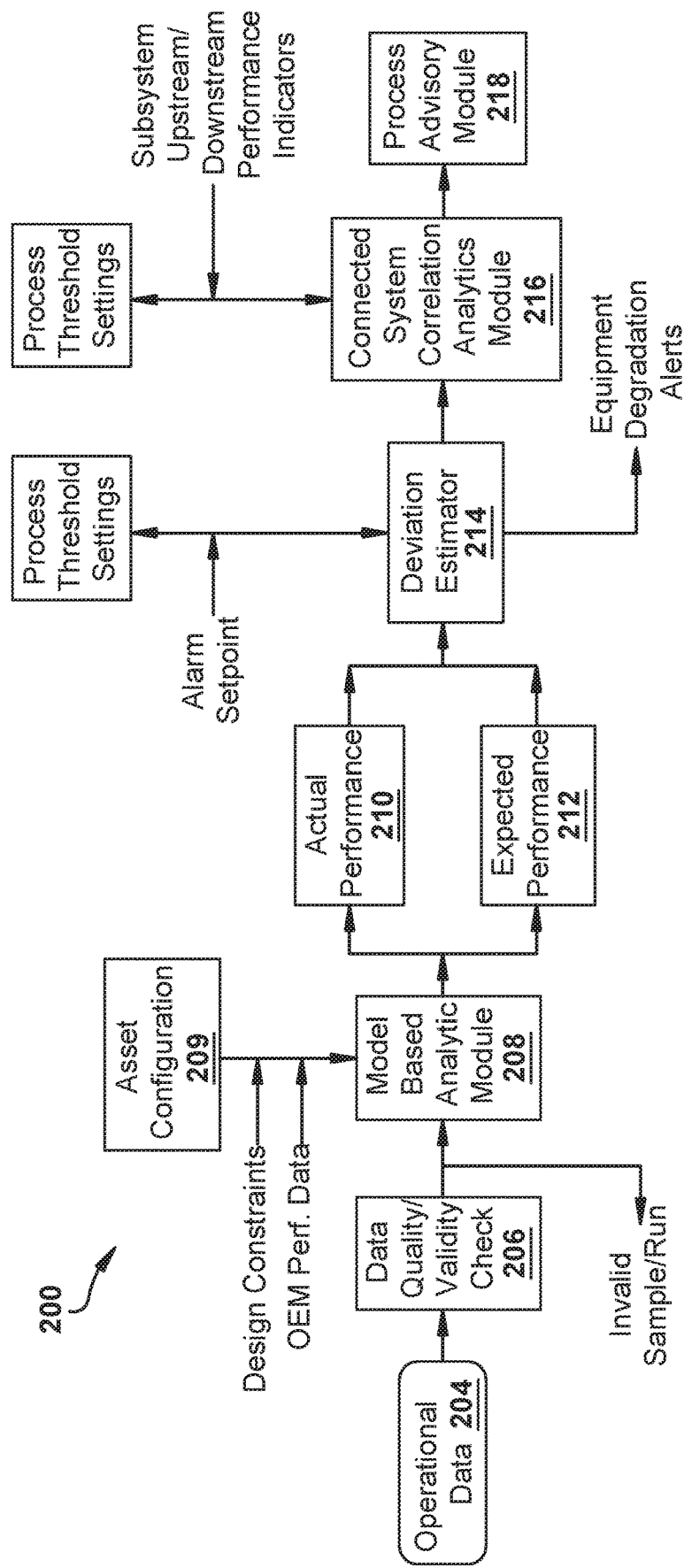
FIG. 5 shows a functional diagram of a performance degradation monitoring system or model for a LNG production train in accordance with aspects of the present invention.

With reference now to FIG. 5, a functional diagram 200 of a performance degradation model is schematically depicted in accordance with aspects of the present invention. It is anticipated that the functionality described in relation to FIG. 5 may be carried out via those systems already described herein, including the component and plant controllers 39, 40, the cloud network 48, and/or the advisory controller 160. The functional diagram 200 may begin, as illustrated, with operational data 204 being received from a data source such as from sensors associated with one or more of the train components 26, as exemplified in FIG. 2. The received operational data then may be processed for quality and validity 206. Invalid samples or runs within the operational data may be discarded, as shown, while validated data may be transmitted to analytic modules, as described below.

According to exemplary embodiments, the validated operational data is then fed into a model based analytic module 208. Within this module 208, the actual performance 210 of the component as well as the expected performance 212 is calculated. The actual performance 210, as will be appreciated, may be calculated according to the measured values of the operating parameters as provided within the validated operational data, and, as the name implies, represent the actual performance of the train component 26 at the time those measured values were obtained. The expected performance 212 is derived via a model of the train component that is maintained within this analytic module 208. Calculation accuracy as to the expected performance may be enhanced via the input to the model of performance curves, design data, and other asset configuration data 209, as may be provided by the original manufacturers of the equipment, historical results, and/or other sources.

At a next step, a deviation estimator 214 may compare the calculated actual performance to the expected performance to determine a difference therebetween. Using this calculated difference, a connected system correlation analytics module 216 (also "correlation analytics module 216") may determine a degradation level that includes upstream and downstream critical component process parameters. The correlation analytics will be discussed in more detail below. As further shown, the deviation estimator 214 may be fed data such as process threshold settings and alarm setpoints. Also, when the difference between actual performance and expected performance exceeds a threshold, equipment degradation alerts may be issued. In regard to the correlation analytics module 216, it may also receive data such as process threshold settings, which may include subsystem upstream and downstream performance indicators.

A process advisory module 218 then may use the upstream and downstream critical component process parameters (as determined within the correlation analytics module 216) to generate system/subsystem advisories. Such advisories may be provided to an operator or control system for automatic implementation. This part of the process will be discussed in more detail below.

According to alternative embodiments, operational data from systems, subsystems and components of the LNG production train is collected, received and processed, and then put through analytics to detect anomalies within the model based analytic module 208. For example, the operational data may be put through process optimization analytics to detect any operational gaps. More specifically, as operational data from one of the train components is received, productivity and optimization analytics within the model base analytic module 208 may be used to detect potential anomalies or operational gaps in advance, and then trigger alerts in response thereto. The detected anomaly or operational gap may then be investigated by drilling down through operational data related to the triggered alert. Further analysis or monitoring then may be carried out on the particular train component or subsystem within the LNG production train.

According to exemplary embodiments, once an alert is triggered (such as, for example, via the illustrated equipment degradation alert), a case may be created that initiates a corresponding work order through a connected maintenance management system (not shown). Maintenance records and work orders may be brought into the analysis module via a text mining tool that is employed to categorize them. Maintenance records and work orders may be associated with cases once an anomaly event is verified. As discussed more below in relation to FIG. 6, these associations may accumulate in a knowledge base over time and be used to create recommendations made when similar cases arise, which may be used to automate maintenance protocols. As stated, as part of the model based analytic module 208, a physics-based or thermodynamic performance model may be constructed and maintained so to calculate the expected performance for comparison to actual performance for each component within the systems/subsystems of the LNG production train. According to preferred embodiments, dynamic physics-based thermodynamic models may be constructed for each of the train components within the LNG production train, and performance indicators for each may be evaluated in real time such that deviations between actual and expected performance trigger alert notifications.

Figure 6:
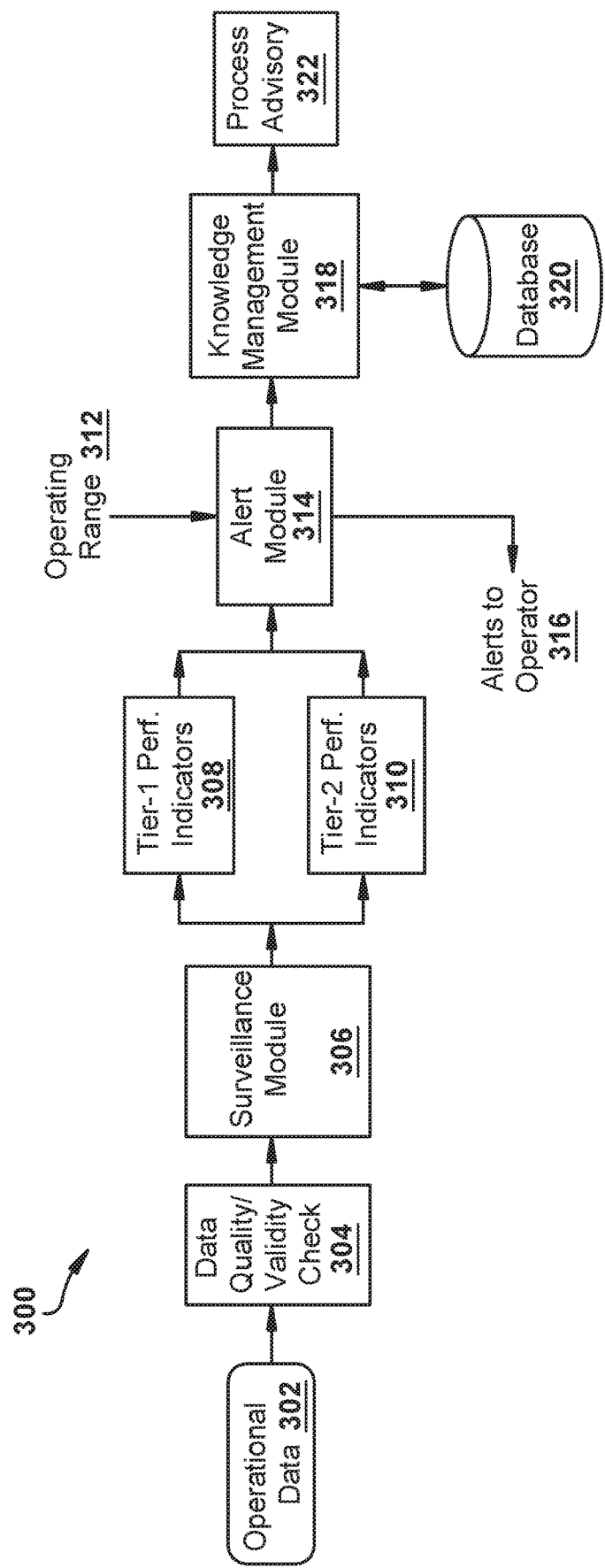
FIG. 6 depicts a functional diagram of an integrated surveillance system for a LNG production train in accordance with aspects of the present invention.

With particular reference now to FIG. 6, a functional diagram of an integrated surveillance system 300 for a LNG production train in accordance with aspects of the present invention. As will be appreciated, the surveillance system 300 may operate in conjunction with and enable aspects of the functionality described above in relation to the functional diagram 200 of FIG. 5. Further, it is anticipated that the functionality described in relation to FIG. 6 may be carried out via those systems already described herein, including the component and plant controllers 39, 40, the cloud network 48, and/or the advisory controller 160. As part of the functional diagram 300, each of the train components within a LNG production train may be surveilled and modeled, such as, for example, the inlet facility, AGR, Dehydration, HG removal, liquefaction, NGL, chilling, fractionation, $N_2$-rejection, He-extraction, co-generation unit, etc. As shown, operational data 302 then may be received from data sources, such as the sensors located within those train components. Within module 304, the operational data may be processed for data quality and validity. Once this is completed, the data may then be delivered to surveillance and performance engines, which are part of a surveillance module 306.

Within the surveillance module 306, surveillance and performance engines may turn the operational data into key performance indicators or, as used herein, "performance indicators". Such performance indicators may be grouped into two main categories. A "Tier-1" classification 308 are those performance indicators that are primarily meant for and used by engineers and/or business or management personnel, whereas a "Tier-2" classification 310 are those that are primarily meant for and used by operators and/or operations personnel, for example, to prevent the LNG production train from violating operability constraints and/or operating in a less than optimal manner. More specifically, operational performance indicators that represent business intelligence, most of which are calculated using sensed operational data, may be grouped under the Tier-1 classification, whereas other performance indicators, many of which are measurements from monitored processes, may be grouped under the Tier-2 classification and used to correct or prevent present operations from deviating from design conditions.

The surveillance module 306, as illustrated, may transmit data related to the performance indicators 308, 310 to an alert module 314. According to exemplary embodiments, each of the performance indicator may be assessed according to a desired operating range 312 (which is provided to the alert module 314) over a defined time period, such as monthly, quarterly, etc. Upon violation of this operating range 314, the alert module 314 may issue an alert 316 to designated personnel, for example, an operator of the LNG production train or to a control systems for automated correction. Such surveillance alerts also may be connected to a knowledge management module 318 and thereby made available for further investigation. This may include the referencing of the alert within a database 320 where prior alerts and other historical data may be stored. From the knowledge management module 318, process advisories 322 may be issued when additional investigation is warranted. Such advisories may be sent to engineers, management, or other appropriate plant stakeholders.

According to exemplary embodiments, the correlation analytics module 216, which was introduced in reference to FIG. 5, may perform a correlation analysis that may be used to predict or prognosticate future failure events and/or factor equipment degradation with upstream and downstream critical component process parameters for issuing subsystem level process advisories. This correlation analysis may be achieved using probabilistic techniques, and, for example, then used to find correlations between symptoms (i.e., measured operating parameters) within the collected operational data and events, faults, or failures, which collectively will be referred to as "failure events" or simply "events", in order to determine root causes. Such correlation analysis may be performed within and across the systems, subsystems, and/or train components of a LNG production train.

Figure 7:
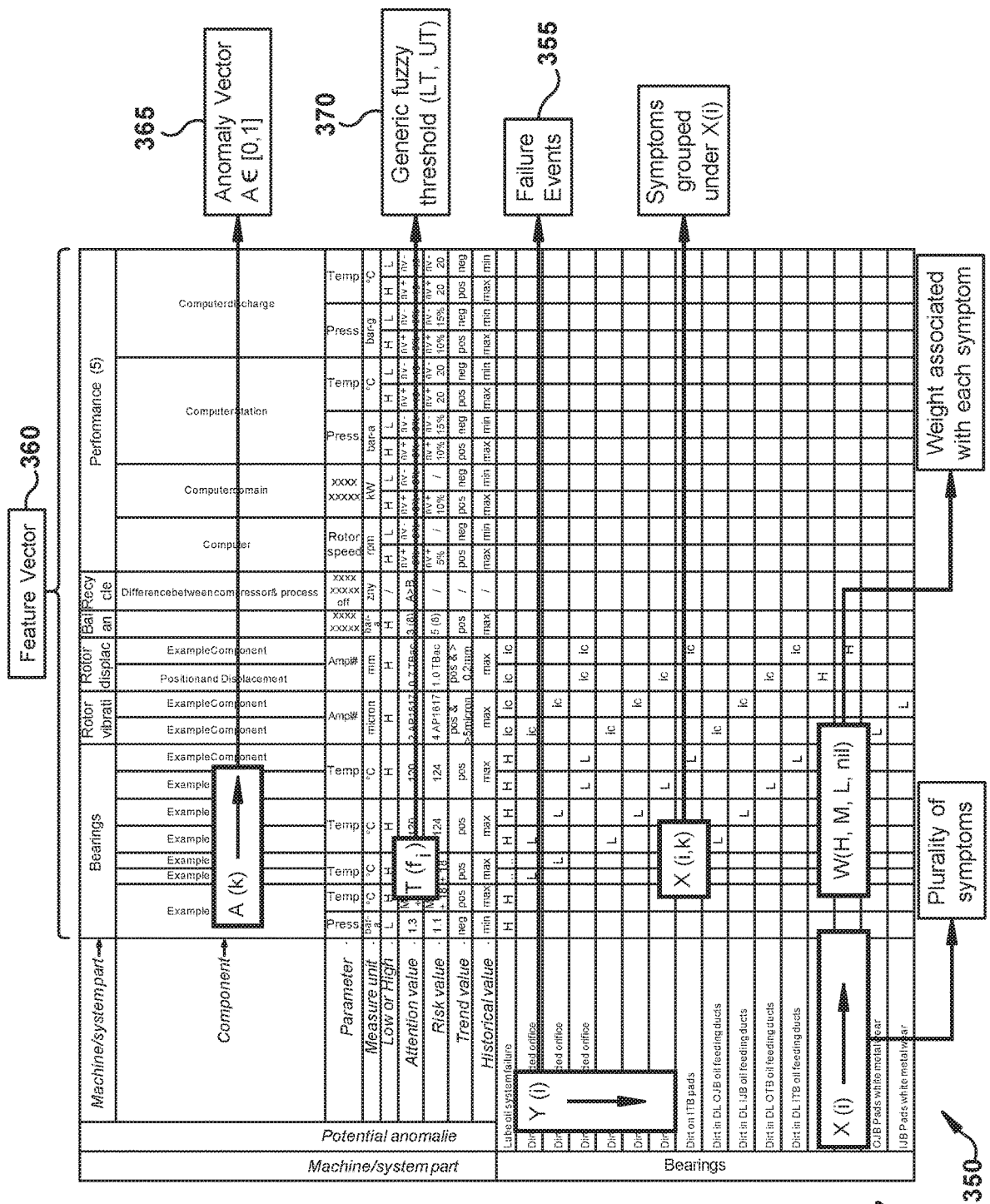
FIG. 7 depicts an exemplary correlation analysis in accordance with aspects of the present invention.

As part of this analysis, a root cause analytic matrix, such as the exemplary matrix 350 shown in FIG. 7, may be used to find the correlations within the dataset. As illustrated, within matrix 350, operational data (such as operating parameters measured by sensors as well as observational information) and corresponding limit values associated therewith, which collectively may be referred to as symptoms, are correlated to find root causes or failure events 355. As should be appreciated, failure events 355 may include occurrences such as failures, alarms, system trips, degradation limits, and the like. This root cause modeling of the LNG production train (and/or any of the train components included therein) may include generating of a feature vector 360, which includes parameters that describe the operation of the system. Then, an anomaly vector 365, which, for example, may be based on fuzzy logic 370, may be developed that links to the feature vector 360 and describes a current status of the system.

Sufficient operational data relating to the modeled system then may be collected and statistically analyzed to determine the relationships or correlations between the measured parameters or symptoms, the presence of which are described in the anomaly vector 365, and root causes or failure events 355. Alternatively, or in addition to the exemplary matrix 350, it should be appreciated that a number of suitable statistical analysis techniques may be used, including, for example, linear regression, neural networks, principal component analysis (PCA), and partial latent structure (PLS) mapping to determine the relationships or interrelatedness between operating parameters and failure events. As would be appreciated, other conventional correlation analytics also may be employed here, including those for probabilistically determining root causes and/or correlating failure mode causation across connected and interrelated subsystems. As part of determining the strength of the correlations between the symptoms provided in the feature vector 360 and the failure events 355, corroborating and refuting measures may be calculated. In this manner, the most probable failure events may be correlated to specific anomaly patterns, which may then form the basis for predictive diagnostic rules going forward.

Figure 8:
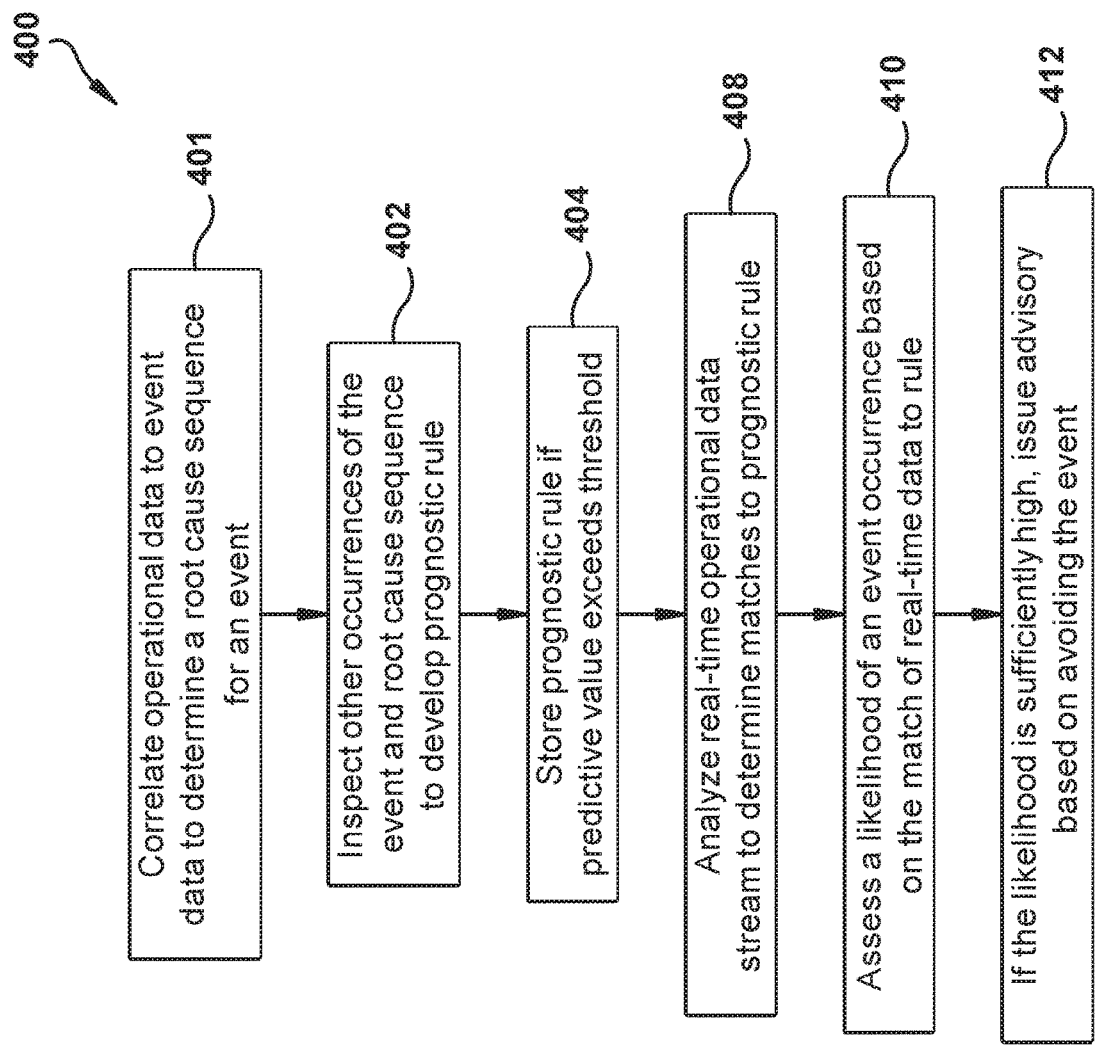
FIG. 8 illustrates a process flow diagram of a method for predicting failure events via correlating operational data with event data in accordance with the present invention.

Thus, one exemplary mode of operation of the present invention (as will be discussed in more detail below with reference to the FIG. 8) includes the controllers 39, 40 and/or the correlation analytics module 216 (see FIG. 4) receiving and storing operational data and event data from the many sensors and other data sources dispersed within a LNG production train and/or particular train components. Present embodiments then may include correlating particular parameters within the operational data to the failure events described in the event data. These correlations may then be used to optimize LNG production, as discussed more below. For example, such optimization may be completed according to the minimization of a cost function by an optimizer.

More specifically, such correlation may include the association of operational data with various types of event data so to quantify the inter-relationships therebetween. As used herein, event data includes data related to alarms, trips, failures, and other such data. This quantified interrelatedness then may be used to enable real-time assessment of the current operational data for the detection or prediction of future events and/or the likelihood thereof. According to the present invention, the correlation analytics module 216 may run process algorithms, such as those discussed in relation to FIG. 7. As will be appreciated, such process algorithms may include instructions for associating operational data with event data that relates to degradation levels or limits. In an exemplary embodiment, such algorithms may include identifying new patterns across multiple time series variables that correlate to a particular alarm or event. In another embodiment, the process may include detecting the existence of predefined patterns or sequences in the operational data in order to detect or predict a new event. Such a pattern may correlate to a varying degree to an event such that the sequence of one or more anomalies within several of the measured parameters indicate a statistically significant increased likelihood of a failure event occurring within a specified period.

As provided herein, such prediction capabilities may be used to control, operate, and/or optimize complex industrial systems, particularly, as specified herein, those related to LNG production. As will be appreciated, equipment maintenance within these type of production facilities has generally evolved over the years from one focused on corrective maintenance, which reacts to equipment breakdowns, to one more focused on predictive analysis and a more proactive approach. Anomaly detection is an important part in such system, providing equipment monitoring, fault diagnostics, and system prognostics. As used herein, fault diagnostics refer to root cause analysis of a detected fault or observed change in an operational state in a piece of equipment, whereas system prognostics refer to the prediction of impending faults, operational state changes, or the estimation of remaining useful life for a component or piece of equipment. Thus, the anomaly detection of present systems may involve monitoring changes to components and subsystems in order to detect equipment malfunction or faulty behavior. As will be appreciated, early detection of anomalies allows for timely maintenance actions taken before faults grow in severity or cause secondary damage and equipment downtime. Detecting abnormal conditions, thus, is an important first step in both system diagnosis and prognosis, because abnormal behavioral characteristics are often the first sign of a potential future equipment failure or compromised performance. One approach to anomaly detection is a data-driven approach that utilizes operational data, such as time series data related to multiple parameters and performance indicators, to detect subsystem performance changes over time.

Thus, according to preferred embodiments, each of the train components may be monitored by a plurality of sensors that provide real-time samples of key metrics such as temperature, pressure, and vibration, which individually or in aggregate represent one or more performance characteristics, as may be described in one or more of the performance indicators referenced above. Such performance indicators may be used to measure the degradation of the equipment or subsystem of one of the train components over time. For example, these performance characteristics may include estimates or measurements of physical conditions, operational efficiency, wear and tear, projected remaining operational lifetime, or time to failure. Further, through the use of sensors, the present system and methods may monitor numerous parameters and collect in real time vast amounts of data for correlative analysis.

In addition to operational data, present systems and methods may monitor each of the train components for the collection of event data, which, as used herein, includes data connected with the occurrence of a fault or failure event. As used herein, such failure events may include, for example, an operating parameter or performance indicator falling outside of a desired threshold, such as may trigger an alarm. Such failure events may further include alarm initiating events, such as a process alarm, equipment alarm, safety alarm, or shutdown alarm. As will be appreciated, process alarms are those that detect changes to the efficiency of the train component or subsystem thereof. Equipment alarms are those that detect problems with equipment. Safety alarms are those that alert to a condition that may be potentially dangerous or damaging to the train component or its surroundings. Shutdown or trip alarms, for example, are those that inform of that automatic shutdown event has been tripped and a shutdown of the train component initiated. According to the present invention, when such failure events occur during the operation of a train component, the operational related to the failure event may be analyzed in order to determine a correlation between the failure event and certain aspects of the operational data. Such correlations then may be used to develop prognostics rules, which then may be applied in the future for predicting when similar events might take place. Such an analysis of the time series operational data for the purpose of anomaly detection is significant for understanding the interrelationship between the performance and operational characteristics of the train component and the occurrence of the failure event. Thus, as provided herein, the present application describes a system that may identify specific patterns or sequences within operational data that correlate to the occurrence of particular failure events. Present systems and methods may further quantify the strength of the correlations between operational data and event data. As part of this, historical operational data may be mined to identify other occurrences of the identified data sequence in the operational data and, based on whether those occasions correlated to an occurrence of the particular event, the strength of the relationship may be modified. For example, it may be determined that a particular sequence in the operational data of a gas turbine acts as an indicator to a failure event and that that event follows according to a determined time lag. The correlation values associated with the defined pattern may indicate the extent of the likelihood that the data sequence leads to the anticipated failure event. The extracted events and correlation values may then be applied to real-time data streams to identify potentially significant data sequences and those may be used probabilistically to more efficiently schedule maintenance.

Returning with specificity to FIG. 8, the process algorithm 400 provides a method by which such correlations may be made between operational data of a train component, which describes the performance and operating characteristics, and event data, which describes particular faults or failure event of the train component. According to exemplary embodiments, the functionality described by the process algorithm 400 may be included in the correlation analytics module 216 of FIG. 5.

Thus, as described above, operational data and event data related to a particular plant component is collected. As initial block 401, according to the methods provided herein, the operational data may be correlated to the event data so to determine a root cause sequence that is an indicator of a particular event. This may be done by selecting occurrences of a particular event and then determining the operational data that relates to each of those occurrences. For example, the related operational data may include time series data for certain parameters that precedes each of the event occurrence. Pursuant to any of the methods already discussed, the operational data then may be correlated to the event so to determine a prognostic rule or root cause sequence for the event. The root cause sequence, for example, may include a particular pattern or sequence of particular parameter values within the operational data that indicates an increased likelihood of the event occurring. It will be appreciated that certain parameters within the operational data may be found as not correlating to the event occurrence and, thus, would not be part of the root cause sequence. As stated, this correlation process once complete may be used to predict adverse events, which may include failures, increased degradation levels, performance declines, etc., before they occur. The "root cause sequence" thus may include particular values for a subset of parameters or performance indicators in time series data that correlate to the event occurrence. With the subset of parameters or performance indicators, some may correlate more strongly than others. Such parameters or performance indicators may be weighted in the resulting prognostic rule such that the ones that have correlate more strongly are given more predictive weight than the others.

In block 402, the correlation analysis may continue by inspecting other instances where the root cause sequence is found in the operation data. For example, the process may find new instances where the root cause sequence is found in the operational data that were not identified initially because these instances did not presage an occurrence of the particular event. The event data that chronologically follows each occurrence of the root cause sequence may be inspected to identify positive cases and negative cases, where a positive case indicates that the event occurred following the root cause sequence and a negative case indicates the event did not occur. In completing this step, the process algorithm may further mine historical data contained in a database. The historical operational data may represent actual sensor data collected from the train component or other such similarly situated or configured train components. These positive and negative cases may be compiled and used to further tune the resulting prognostic rule. Given the totality of the data, this step in the process may conclude with a determination as to the overall accuracy or predictive power of the prognostic rule related to the root cause sequence. This may be completed via conventional statistical analysis.

In block 404, the process algorithm 400 may store the prognostic rule if the predictive value exceeds a predetermined threshold for later use. For example, if the predictive value exceeds a threshold making its usage economically advantageous, the prognostic rule and/or the root cause sequence may be stored in a database for future implementation, as described below.

In block 408, the prognostic rule and/or the root cause sequence may be used to analyze streaming operational data. That is, as new operational data arrives from the particular train component or one similarly configured, the operational data may be analyzed pursuant to the stored root cause sequence and/or corresponding prognostic rule as well as any other stored root cause sequences and/or corresponding prognostic rules. In doing this, for example, data sequences within the new operational data may be found to have a strong match to a root cause sequence that was found to have a moderate predictive value, or, for that matter, a moderate match to a root cause sequence that was found to have a strong predictive value. For example, information regarding the root cause sequences having a high correlation may be stored as an abstract mathematical model of the collected data to create a data mining model of particular data sequences having detective or predictive value. After the data mining model is created, new data may be examined with respect to the model to determine if the data fits the prognostic rule.

In block 410, the likelihood of the event occurring is assessed given the analysis performed in block 408. In block 412, if the likelihood of occurrence is found to be sufficiently high, then preemptive action may be advised and/or taken to prevent the predicted event from occurring. For example, based on a predicted event likelihood, preventative maintenance may be performed so that the event is avoided.

Further, because a problem or anomaly reported by one train component may have repercussions across the entire system, the prediction system of the present invention may notify the operator or plant controller 40 when one train component is operating outside its predefined parameters. Based on the predicted sequences of events, the operator or plant controller 40 may quickly isolate and troubleshoot the problem. Also, once a predictive sequence has been detected, the system may automatically perform preventative maintenance by adjusting operational parameters of the system. Alternatively or in conjunction with the system, an operator may be alerted to take the preventative measures. The embodiments illustrated and described above, thus, disclose a system and method for associating particular sequences of operational data with both extracted events and existing events, and quantify the relationship between them. These associations enable real-time assessment of operational data to detect or predict future events.

Accordingly, with reference also to the process advisory module 216 of FIG. 5, embodiments of the present invention include the generation of an optimization advisory based on possible scenarios that are evaluated to address particular situations or avoid failure events, either by equipment correction or process correction. Equipment correction advisories may include a recommendations as to a maintenance procedure performed on a particular subsystem of one of the train components. Process correction advisories are enabled with outcomes produced by a system level dynamic simulation engine. In this manner, a unique solution may be provided to LNG production trains that allows: an evaluation of overall process performance through an end-end surveillance module; an understanding the current train losses in terms of energy and mass and identification of those areas in need of improvement through system level performance loss analysis; a connected system correlation analysis to determine and understand the root cause of a problem or failure; and advisories as to how to manage a degraded train component and operate it in a way that best reduces overall losses. Thusly, the integrated tools and methodologies provided herein may be used to enhance or optimize the operation of LNG production trains by reducing the generation of excess flash gas and/or reducing power consumed in the production process. As shown, present system and methods may dynamically operate LNG production trains closer to design points or limitations, detect anomalies earlier, and more diligently provide alerts/notifications in case of design deviation. The present invention also may provide engineering insights that compare and correlate performance indicators and assess differences in terms of performance shortfalls between two similarly configured LNG production trains. Present systems and methods, as disclosed herein, may further aid in understanding the performance degradation of monitored components in the LNG production train, such as gas turbines, compressors, and heat exchangers, and accelerate the analysis to determine the root cause of a failure event using the automated historical trending and charting tools. Thus, specific metrics and benefits related to the systems and methods of the present invention, as provided herein, may include: reduced unplanned production losses (for example, via reduced equipment downtime, increased efficiency, and reduced lost production); improved productivity (for example, via reducing the burden of data analysis and helping operators to identify and focus on the most important issues); reduced risk (for example, via providing early warnings while potential issues are still avoidable or manageable); and reduced maintenance costs (for example, via reducing maintenance cost of unscheduled maintenance versus planned maintenance).

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

We claim:

1. A system comprising:
 a liquefied natural gas (LNG) production train, the LNG production train comprising connected train components;
 an integrated surveillance system for monitoring an operation of the train components, wherein the integrated surveillance system includes multiple sensors positioned within the train components for measuring and recording both: operational data, which includes data relating to operating parameters; and event data, which includes data relating to occurrences of a failure event;
 a control system operably connected to the LNG production train, the control system comprising:
 a hardware processor; and a machine-readable storage medium on which is stored instructions that cause the hardware processor to execute a process that includes the steps of:
- using the multiple sensors of the integrated surveillance system to measure and record the operational data and the event data related to the operation of the train components over a historical operating period;
- performing a correlation analysis whereby a correlation is determined within the historical operating period between the occurrences of the failure event and the operational data that precedes the failure event;
- given results of the correlation analysis, deriving a prognostic rule that indicates a likelihood of the failure event occurring based on values of the operating parameters of the operational data;
- applying the prognostic rule to current values of the operating parameters and determining therefrom a current likelihood of the failure event occurring;
- determining an advisory related to the current likelihood of the failure event occurring; and
- issuing the advisory, wherein the correlation analysis comprises quantifying a correlation strength between each of the operating parameters and the occurrences of the failure event;
wherein the operating parameters include at least a first operating parameter, a second operating parameter, and a third operating parameter; and
wherein the correlation analysis includes findings wherein:
- each of the first operating parameter and the second operating parameter is determined to correlate to the occurrences of the failure event while the third operating parameter is determined to not correlate to the occurrences of the failure event; and
- based on a difference between the correlation strength of the first operating parameter and the second operating parameter, determining a relative predictive strength between the first operating parameter and the second operating parameter.

2. The system according to claim 1, wherein the step of deriving the prognostic rule includes:
- weighting the first operating parameter and the second operating parameter in accordance with the relative predictive strength determined between the first operating parameter and the second operating parameter; and
- preventing the prognostic rule from dependency upon the third operating parameter;

wherein the correlation analysis comprises a root cause analytic matrix in which a feature vector and an anomaly vector are correlated against a failure modes to determine a root cause of the failure event.

3. The system according to claim 1, wherein the correlation analysis comprises probabilistic techniques whereby each of the operating parameters of the operational data from the historical operating period is correlated to determine a failure mode relating to the failure event; and
wherein the correlation analysis comprises one of: linear regression; machine learning; a neural network; a principal component analysis; and a partial latent structure mapping.

4. The system according to claim 1, wherein the prognostic rule includes a root cause data sequence that comprises data sequence within the operational data that is determined to materially increase the likelihood of the failure event occurring; and
wherein the correlation analysis further comprises selecting time series data related to the operating parameters of the operational data that precedes each of the occurrences of the failure event.

5. The system according to claim 4, further comprising a step of tuning the derived prognostic rule;
wherein the step of tuning comprises:
- determining a total number of positive cases within the operational data from the historical operating period, wherein a positive case comprises one in which the root cause data sequence is found to precede the occurrences of the failure event in accordance with the prognostic rule;
- inspecting the operational data from the historical operating period to determine a total number of negative cases, wherein a negative case comprises one in which the root cause data sequence is present but does not precede one of the occurrences of the failure event; and
- adjusting the prognostic rule according to a ratio of the total number of positive cases to the total number of negative cases.

6. The system according to claim 5, wherein the step of determining the advisory includes comparing the current likelihood of the failure event occurring to a predetermined threshold required for issuing the advisory; and
wherein the predetermined threshold required for issuing the advisory is derived via an economic cost analysis, wherein a cost of performing a preemptive action, which comprises an action that reduces the current likelihood of the failure event occurring, is compared to a cost associated with the failure event occurring discounted by the current likelihood of the failure event occurring.

7. The system according to claim 3, wherein the LNG production train comprises a hydrocarbon fluid processing plant that is configured such that the train components are arranged sequentially according to an industrial process by which a feed stream comprising gaseous methane is processed into a product stream comprising liquid methane; and
wherein the LNG production train comprises three processing sections that include an inlet section, a gas treatment section, and a gas liquefaction section, and wherein each of the three processing sections include a plurality of the train components;
wherein:
- the train components within the inlet section are configured to separate the feed gas from liquid water and hydrocarbon liquids, the train components within the inlet section comprising at least one of the following: a slug catcher unit; a condensate stabilizer unit; an off-gas compressor unit; and a feed gas preheater;
- the train components within the gas treatment section are configured to remove impurities from the feed gas, the train components within the gas treatment section comprising at least one of the following: an acid gas removal system, dehydration unit, a sulfur recovery unit; and
- the train components within the gas liquefaction section are configured to cooling the feed gas via heat exchange with one or more refrigerants so to produce the product stream of the liquid, the train components within the gas liquefaction section comprising at least one of the following: a liquefaction unit having one or more cryogenic heat exchanger units; one or more refrigerant compression units corresponding respectively with the one or more refrigerants; and a cogeneration unit having a gas turbine.

8. The system according to claim 7, wherein the train components comprise sequentially connected components in the LNG production train that are collectively used to process natural gas from an initial feed of raw natural gas to a final product of the liquefied natural gas; and
  wherein the integrated surveillance system comprises:
    designating one of the train components of the LNG production train as a selected train component;
    providing a physics-based model of the selected train component;
    selecting a performance indicator for the selected train component, the performance indicator being derived from a measured value of at least one of the operating parameters related to the selected train component;
    determining an actual performance for the selected train component according to the performance indicator;
    using the physics-based model to determine an expected performance of the selected train component, the expected performance being based on a modeled value of the performance indicator as calculated by the physics-based model, wherein the actual performance and the expected performance each correspond to a same period of the operation of the selected train component; and
    comparing the actual performance to the expected performance to determine a deviation therebetween.

9. The system according to claim 8, wherein the failure event comprises the deviation between the actual and expected performance exceeding a predetermined threshold; and
  wherein the advisory comprises an equipment degradation alert;
  wherein the process further comprises the step of calculating, relative to the selected train component, upstream and downstream critical component process parameters based on the deviation.

10. The system according to claim 8, wherein the failure event comprises the deviation between the actual and expected performance exceeding a predetermined threshold; and wherein the advisory comprises a preventative maintenance action;
  wherein the step of issuing the advisory comprises initiating a work order related to the preventative maintenance action;
  wherein the process further comprises the step of recording data related to a completion of the work order.

11. The system according to claim 8, wherein the performance indicator comprises one of a Tier-1 performance indicator and a Tier-2 performance indicator;
  wherein:
    the Tier-1 performance indicator comprises business intelligence pertaining to an economic performance of the LNG production train; and
    the Tier-2 performance indicator comprises a current value of one of the operating parameters that relates to an operability constraint of the LNG production train.

12. The system according to claim 8, wherein the process further comprises the steps of:
  designating one of the train components of the LNG production train as an upstream train component, the upstream train component comprising the train component that connects to the selected train component and, relative thereto, resides in an upstream position; and
  designating one of the train components of the LNG production train as a downstream train component, the downstream train component comprising the train component that connects to the selected train component and, relative thereto, resides in a downstream position;
  wherein the integrated surveillance system includes the multiple sensors being positioned within each of the selected train component, the upstream train component, and the downstream train component for measuring and recording:
    the operational data for each of the selected train component, the upstream train component, and the downstream train component; and
    the event data for the occurrences of the failure event that occurs within the selected train component;
  wherein the step of using the integrated surveillance system comprises measuring and recording over a historical operating period: the operational data within the selected train component, the upstream train component, and the downstream train component;
  and the event data within the selected train component.

13. The system according to claim 12, wherein the step of determining the advisory comprises an optimization process that includes the steps of:
  determining optimization inputs, including:
    determining one or more operating goals associated with the operation of the LNG production train;
    determining one or more operating constraints associated with the operation of the LNG production train;
    determining one or more current operating conditions for the LNG production train, including the current likelihood of the failure event occurring;
  providing the optimization inputs to an optimization system that includes:
    a system model of the LNG production train, the system model comprising physics-based models corresponding respectively to the selected train component and the connected train component;
    an optimizer for determining an optimal operating mode for the LNG production train given the optimization inputs; and
  using the optimization system to calculate the optimal operating mode for operating the LNG production train.

14. The system according to claim 13, wherein the optimizer of the optimization system is selected from a group consisting of: linear programming, quadratic programming, mixed integer non-linear programming, stochastic programming, global non-linear programming, genetic algorithms, and particle/swarm techniques; and
  wherein the optimization process further comprising the steps of:
    receiving a cost function that defines costs associated with each of the one or more operating goals and the one or more operating constraints, wherein the optimizer of the optimization system is configured to determine the optimal operating mode by accessing the system model to minimize the cost function;
  wherein the cost function comprises a mathematical representation for evaluating the operation of the LNG production train relative to the one or more operating goals and the one or more operating constraints; and
  wherein the cost function includes a term related to a minimization of a flash gas.

15. The system according to claim 13, wherein the optimizer of the optimization system is selected from a group consisting of: linear programming, quadratic programming, mixed integer non-linear programming, stochastic programming, global non-linear programming, genetic algorithms, and particle/swarm techniques; and wherein the optimization process further comprising the steps of:

receiving a cost function that defines costs associated with each of the one or more operating goals and the one or more operating constraints, wherein the optimizer of the optimization system is configured to determine the optimal operating mode by accessing the system model to minimize the cost function;

wherein the cost function comprises a mathematical representation for evaluating the operation of the LNG production train relative to the one or more operating goals and the one or more operating constraints; and wherein the cost function includes a term related to a minimization of a specific energy consumption per unit of LNG produced.

16. A computer-implemented method for enhancing a performance of a liquefied natural gas (LNG) production train, the LNG production train comprising connected train components, the method comprising the steps of:

constructing an integrated surveillance system for monitoring an operation of the train components, wherein the integrated surveillance system includes multiple sensors positioned within the train components for measuring and recording both: operational data, which includes data relating to operating parameters; and event data, which includes data relating to occurrences of a failure event;

using the integrated surveillance system to measure and record the operational data and the event data related to the operation of the train components over a historical operating period;

performing a correlation analysis whereby a correlation is determined within the historical operating period between the occurrences of the failure event and the operational data that precedes the failure event;

given results of the correlation analysis, deriving a prognostic rule that indicates a likelihood of the failure event occurring based on values of the operating parameters of the operational data;

applying the prognostic rule to current values of the operating parameters and determining therefrom a current likelihood of the failure event occurring;

determining an advisory related to the current likelihood of the failure event occurring; and issuing the advisory, wherein performing the correlation analysis further comprises quantifying a correlation strength between each of the operating parameters and the occurrences of the failure event;

wherein the operating parameters include at least a first operating parameter, a second operating parameter, and a third operating parameter; and wherein performing the correlation analysis includes providing findings wherein:

each of the first operating parameter and the second operating parameter is determined to correlate to the occurrences of the failure event while the third operating parameter is determined to not correlate to the occurrences of the failure event; and based on a difference between the correlation strength of the first operating parameter and the second operating parameter, determining a relative predictive strength between the first operating parameter and the second operating parameter.

17. The method according to claim 16, wherein the failure event comprises one of: a system failure; an alarm; a trip causing a shutdown of the LNG production train; a degradation limit being reached; and one of the operating parameters violating a predetermined threshold; and wherein the operational data and the event data related to the operation of the train components over the historical operating period comprises the operational data and the event data collected over a time frame of at least 1 year;

wherein the advisory comprises a preemptive action that is anticipated to reduce the current likelihood of the failure event occurring.

18. The method according to claim 17, wherein the step of issuing the advisory comprises one of:

sending an electronic communication to an operator related to the LNG production train that seeks an approval to initiate the preemptive action; and sending an electronic communication related to the advisory to a control system related to the LNG production train that automatedly initiates the preemptive action;

wherein the advisory comprises one of:

an equipment correction advisory; and a process correction advisory;

wherein:

the equipment correction advisory comprises a maintenance procedure to perform on one of the train components; and the process correction advisory comprises a new operating mode for operating given a simulation of the operation of the LNG production train.

19. The system according to claim 1, wherein the failure event comprises one of: a system failure; an alarm; a trip causing a shutdown of the LNG production train; a degradation limit being reached; and one of the operating parameters violating a predetermined threshold; and wherein the operational data and the event data related to the operation of the train components over the historical operating period comprise the operational data and the event data collected over a time frame of at least 1 year;

wherein the advisory comprises a preemptive action that is anticipated to reduce the current likelihood of the failure event occurring.

20. The system according to claim 19, wherein the step of issuing the advisory comprises sending an electronic communication to an operator related to the LNG production train that seeks an approval to initiate the preemptive action;

wherein the advisory comprises one of:

an equipment correction advisory;

and a process correction advisory;

wherein:

the equipment correction advisory comprises a maintenance procedure to perform on one of the train components; and the process correction advisory comprises a new operating mode for operating given a simulation of the operation of the LNG production train.

21. The system according to claim 19, wherein the step of issuing the advisory comprises sending an electronic communication related to the advisory to a control system related to the LNG production train that automatedly initiates the preemptive action.

* * * * *